(12) United States Patent
Aklivanh et al.

(10) Patent No.: US 12,478,244 B2
(45) Date of Patent: Nov. 25, 2025

(54) METHODS AND DEVICES FOR TRANSMITTING EMERGENCY SIGNALS OVER DIFFERENTIAL SIGNAL LINES IN ROBOTIC SYSTEMS

(71) Applicant: Auris Health, Inc., Redwood City, CA (US)

(72) Inventors: Eyal Aklivanh, Belmont, CA (US); Chase Paul Hathaway, San Francisco, CA (US); Shane Daniel Kent, Millbrae, CA (US); Sven Wehrmann, Redwood City, CA (US); Nicholas J. Eyre, Redwood City, CA (US)

(73) Assignee: Auris Health, Inc., Santa Clara, CA (US)

( * ) Notice: Subject to any disclaimer, the term of this patent is extended or adjusted under 35 U.S.C. 154(b) by 186 days.

(21) Appl. No.: 18/324,817

(22) Filed: May 26, 2023

(65) Prior Publication Data

US 2023/0301488 A1 Sep. 28, 2023

Related U.S. Application Data

(63) Continuation of application No. PCT/IB2021/061421, filed on Dec. 7, 2021.
(Continued)

(51) Int. Cl.
*A61B 1/00* (2006.01)
*A61B 34/30* (2016.01)
*A61B 34/37* (2016.01)

(52) U.S. Cl.
CPC ...... *A61B 1/00006* (2013.01); *A61B 1/00114* (2013.01); *A61B 1/0016* (2013.01); *A61B 34/37* (2016.02); *A61B 2034/305* (2016.02)

(58) Field of Classification Search
CPC ............ H04L 25/0272; A61B 1/00114; A61B 1/00006; A61B 1/0016; A61B 34/30;
(Continued)

(56) References Cited

U.S. PATENT DOCUMENTS 5,485,488 A 1/1996 Van Brunt et al.
9,763,741 B2 9/2017 Alvarez et al.
(Continued)

FOREIGN PATENT DOCUMENTS

CN 107334531 A * 11/2017
CN 109616378 A 4/2019
(Continued)

OTHER PUBLICATIONS

Machine translation of Li et al. Chinese Patent Document CN 107334531 A Nov. 2017 (Year: 2017).*
(Continued)

*Primary Examiner* — Kevin J Comber

(74) *Attorney, Agent, or Firm* — Frost Brown Todd LLP

(57) ABSTRACT

A robotic medical system can include a first node, a second node, and a first pair of electrical conductors for differential communication between the first node and the second node so that data signals are communicated between the first node and the second node as differential signals. The first node can include a first electrical circuit electrically coupled with the first pair of electrical conductors. The first electrical
(Continued)

circuit can communicate emergency stop signals between the first node and the second node as non-differential signals over the first pair of electrical conductors.

18 Claims, 29 Drawing Sheets

Related U.S. Application Data

(60) Provisional application No. 63/132,461, filed on Dec. 30, 2020.

(58) Field of Classification Search
CPC ......... A61B 34/37; A61B 34/20; A61B 34/71; A61B 2034/301; A61B 2034/2051; A61B 2034/305; A61B 2034/2065; A61B 90/50; A61B 2090/571; A61B 2017/00477; B25J 9/1689; B25J 9/1674; G05B 2219/50198; G05B 2219/45118
USPC .......................................................... 361/1
See application file for complete search history.

(56) References Cited

U.S. PATENT DOCUMENTS

| 2016/0242849 | A9 | 8/2016 | Crawford et al. |
| 2019/0083186 | A1* | 3/2019 | Zietlow .................. A61B 34/37 |

FOREIGN PATENT DOCUMENTS

| EP | 1816780 A1 | 8/2007 |
| KR | 1020110069815 A | 6/2011 |
| WO | 2012170256 A1 | 12/2012 |
| WO | 2018210600 A1 | 11/2018 |

OTHER PUBLICATIONS

European Search Report, Extended, and Written Opinion dated Oct. 17, 2024 for Application No. EP 21914798.0, 11 pgs.

PCT International Search Report; Application No. PCT/IB2021/061421; Mar. 8, 2022; 8 pages.

PCT Written Opinion of the International Searching Authority; Application No. PCT/IB2021/061421; Mar. 8, 2022; 3 pages.

* cited by examiner

METHODS AND DEVICES FOR TRANSMITTING EMERGENCY SIGNALS OVER DIFFERENTIAL SIGNAL LINES IN ROBOTIC SYSTEMS

CROSS-REFERENCE TO RELATED APPLICATIONS

The present application is a continuation of International Patent Application No. PCT/IB2021/061421 filed Dec. 7, 2021 and entitled "METHODS AND DEVICES FOR TRANSMITTING EMERGENCY SIGNALS OVER DIFFERENTIAL SIGNAL LINES IN ROBOTIC SYSTEMS," which claims priority to U.S. Provisional Application No. 63/132,461 filed Dec. 30, 2020 and entitled, "METHODS AND DEVICES FOR TRANSMITTING EMERGENCY SIGNALS OVER DIFFERENTIAL SIGNAL LINES IN ROBOTIC SYSTEMS," both of which are incorporated herein by reference in their entirety for all purposes.

TECHNICAL FIELD

The systems and methods disclosed herein are directed to methods and devices for transmitting emergency signals over differential signal lines, and more particularly to methods and devices for transmitting emergency signals over differential signal lines in robotic systems.

BACKGROUND

Robotic systems typically have a number of movable joints to provide multiple degrees of freedom. For robotic systems that perform critical operations, such as surgical operations, it is necessary to communicate emergency signals to the multiple joints (or associated motor drivers) rapidly and reliably. However, addition of dedicated communication lines for emergency signals can be challenging, and can increase the size and complexity of robotic systems. Thus, there is a need for robotic systems that can communicate emergency signals rapidly and reliably without additional communication lines.

SUMMARY

Disclosed herein is a robotic system using one or more pairs of electrical conductors for transmitting differential signals between nodes (e.g., motor drivers) of the robotic system. The robotic system communicates emergency signals as non-differential signals, which, in turn, allows different nodes of the robotic system to communicate the emergency signals rapidly and reliably without additional communication lines.

In accordance with some embodiments, a robotic system includes a first node and a second node, and a first pair of electrical conductors for differential communication between the first node and the second node so that data signals are communicated between the first node and the second node as differential signals. The first node includes a first electrical circuit electrically coupled with the first pair of electrical conductors, and the first electrical circuit communicates emergency stop signals between the first node and the second node as non-differential signals over the first pair of electrical conductors.

In accordance with some embodiments, a method for transmitting an emergency stop signal in a medical system with multiple nodes includes transmitting an emergency stop signal between a first node and a second node of the multiple nodes of the medical system through a first differential signal interface by changing a common-mode voltage of the first differential signal interface between the first node and the second node.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

DETAILED DESCRIPTION

1. Overview

Aspects of the present disclosure may be integrated into a robotically-enabled medical system capable of performing a variety of medical procedures, including both minimally invasive, such as laparoscopy, and non-invasive, such as endoscopy, procedures. Among endoscopy procedures, the system may be capable of performing bronchoscopy, ureteroscopy, gastroscopy, etc.

In addition to performing the breadth of procedures, the system may provide additional benefits, such as enhanced imaging and guidance to assist the physician. Additionally, the system may provide the physician with the ability to perform the procedure from an ergonomic position without the need for awkward arm motions and positions. Still further, the system may provide the physician with the ability to perform the procedure with improved ease of use such that one or more of the instruments of the system can be controlled by a single user.

Various embodiments will be described below in conjunction with the drawings for purposes of illustration. It should be appreciated that many other embodiments of the disclosed concepts are possible, and various advantages can be achieved with the disclosed embodiments.

Headings are included herein for reference and to aid in locating various sections. These headings are not intended to limit the scope of the concepts described with respect thereto. Such concepts may have applicability throughout the entire specification.

A. Robotic System—Cart

Figure 1:
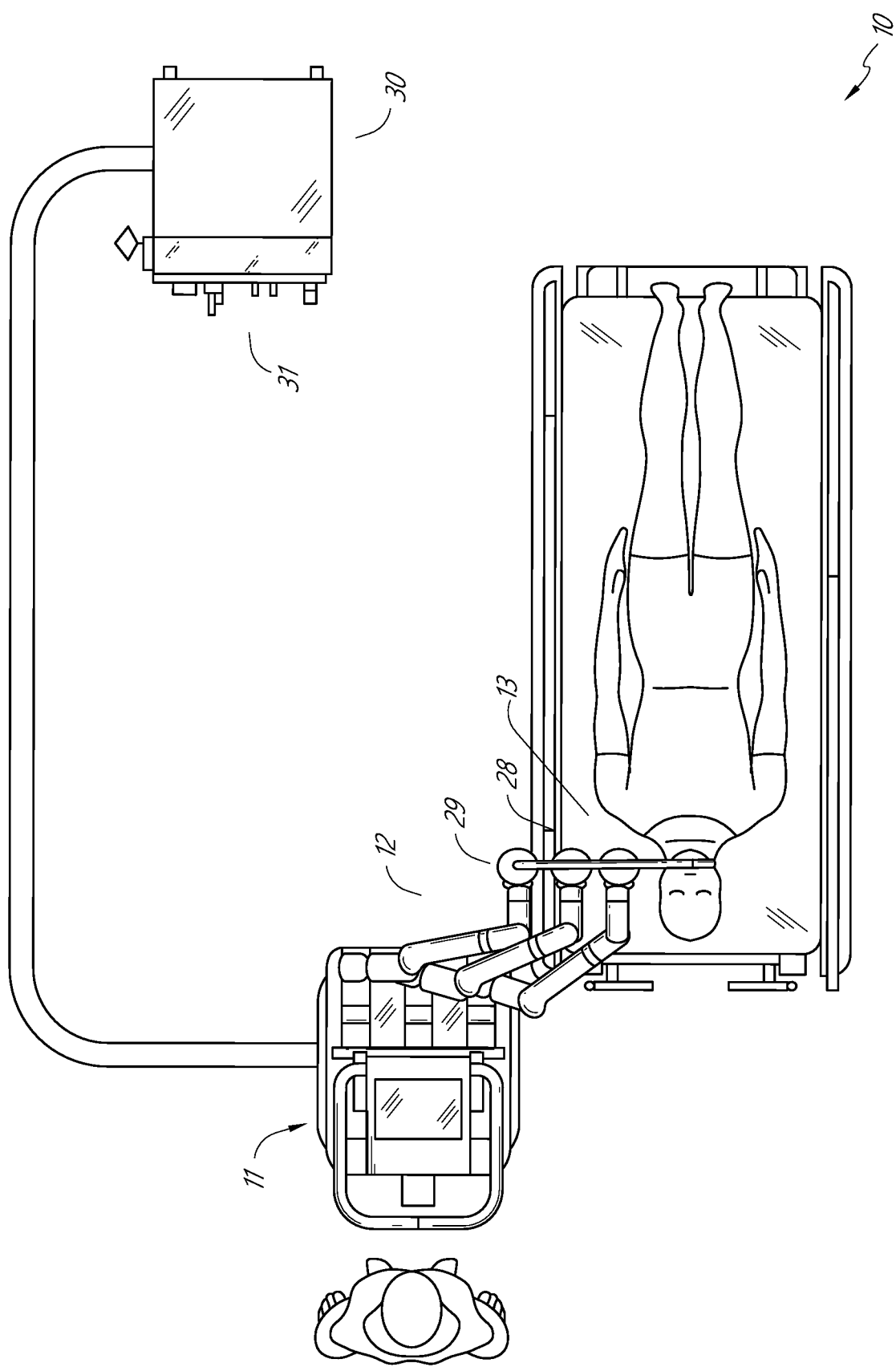
FIG. 1 illustrates an embodiment of a cart-based robotic system arranged for diagnostic and/or therapeutic bronchoscopy procedure(s).
Figure 2:
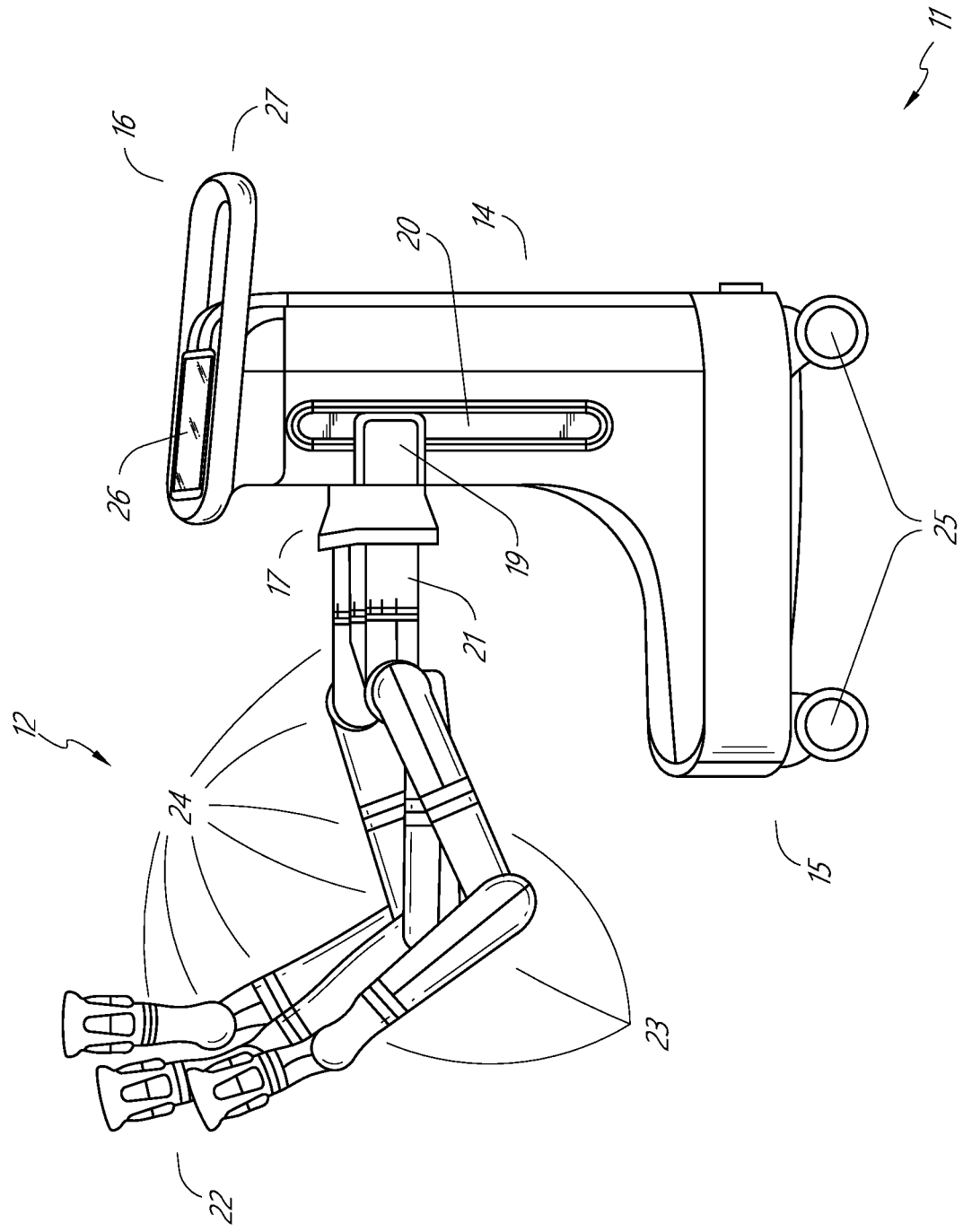
FIG. 2 depicts further aspects of the robotic system of FIG. 1.

The robotically-enabled medical system may be configured in a variety of ways depending on the particular procedure. FIG. 1 illustrates an embodiment of a cart-based robotically-enabled system 10 arranged for a diagnostic and/or therapeutic bronchoscopy procedure. During a bronchoscopy, the system 10 may comprise a cart 11 having one or more robotic arms 12 to deliver a medical instrument, such as a steerable endoscope 13, which may be a procedure-specific bronchoscope for bronchoscopy, to a natural orifice access point (i.e., the mouth of the patient positioned on a table in the present example) to deliver diagnostic and/or therapeutic tools. As shown, the cart 11 may be positioned proximate to the patient's upper torso in order to provide access to the access point. Similarly, the robotic arms 12 may be actuated to position the bronchoscope relative to the access point. The arrangement in FIG. 1 may also be utilized when performing a gastro-intestinal (GI) procedure with a gastroscope, a specialized endoscope for GI procedures. FIG. 2 depicts an example embodiment of the cart in greater detail.

With continued reference to FIG. 1, once the cart 11 is properly positioned, the robotic arms 12 may insert the steerable endoscope 13 into the patient robotically, manually, or a combination thereof. As shown, the steerable endoscope 13 may comprise at least two telescoping parts, such as an inner leader portion and an outer sheath portion, each portion coupled to a separate instrument driver from the set of instrument drivers 28, each instrument driver coupled to the distal end of an individual robotic arm. This linear arrangement of the instrument drivers 28, which facilitates coaxially aligning the leader portion with the sheath portion, creates a "virtual rail" 29 that may be repositioned in space by manipulating the one or more robotic arms 12 into different angles and/or positions. The virtual rails described herein are depicted in the Figures using dashed lines, and accordingly the dashed lines do not depict any physical structure of the system. Translation of the instrument drivers 28 along the virtual rail 29 telescopes the inner leader portion relative to the outer sheath portion or advances or retracts the endoscope 13 from the patient. The angle of the virtual rail 29 may be adjusted, translated, and pivoted based on clinical application or physician preference. For example, in bronchoscopy, the angle and position of the virtual rail 29 as shown represents a compromise between providing physician access to the endoscope 13 while minimizing friction that results from bending the endoscope 13 into the patient's mouth.

The endoscope 13 may be directed down the patient's trachea and lungs after insertion using precise commands from the robotic system until reaching the target destination or operative site. In order to enhance navigation through the patient's lung network and/or reach the desired target, the endoscope 13 may be manipulated to telescopically extend the inner leader portion from the outer sheath portion to obtain enhanced articulation and greater bend radius. The use of separate instrument drivers 28 also allows the leader portion and sheath portion to be driven independent of each other.

For example, the endoscope 13 may be directed to deliver a biopsy needle to a target, such as, for example, a lesion or nodule within the lungs of a patient. The needle may be deployed down a working channel that runs the length of the endoscope to obtain a tissue sample to be analyzed by a pathologist. Depending on the pathology results, additional tools may be deployed down the working channel of the endoscope for additional biopsies. After identifying a nodule to be malignant, the endoscope 13 may endoscopically deliver tools to resect the potentially cancerous tissue. In some instances, diagnostic and therapeutic treatments can be delivered in separate procedures. In those circumstances, the endoscope 13 may also be used to deliver a fiducial to "mark" the location of the target nodule as well. In other instances, diagnostic and therapeutic treatments may be delivered during the same procedure.

The system 10 may also include a movable tower 30, which may be connected via support cables to the cart 11 to provide support for controls, electronics, fluidics, optics, sensors, and/or power to the cart 11. Placing such functionality in the tower 30 allows for a smaller form factor cart 11 that may be more easily adjusted and/or re-positioned by an operating physician and his/her staff. Additionally, the division of functionality between the cart/table and the support tower 30 reduces operating room clutter and facilitates improving clinical workflow. While the cart 11 may be positioned close to the patient, the tower 30 may be stowed in a remote location to stay out of the way during a procedure.

In support of the robotic systems described above, the tower 30 may include component(s) of a computer-based control system that stores computer program instructions, for example, within a non-transitory computer-readable storage medium such as a persistent magnetic storage drive, solid state drive, etc. The execution of those instructions, whether the execution occurs in the tower 30 or the cart 11, may control the entire system or sub-system(s) thereof. For example, when executed by a processor of the computer system, the instructions may cause the components of the robotics system to actuate the relevant carriages and arm mounts, actuate the robotics arms, and control the medical instruments. For example, in response to receiving the control signal, the motors in the joints of the robotics arms may position the arms into a certain posture.

The tower 30 may also include a pump, flow meter, valve control, and/or fluid access in order to provide controlled irrigation and aspiration capabilities to the system that may be deployed through the endoscope 13. These components may also be controlled using the computer system of tower 30. In some embodiments, irrigation and aspiration capabilities may be delivered directly to the endoscope 13 through separate cable(s).

The tower 30 may include a voltage and surge protector designed to provide filtered and protected electrical power to the cart 11, thereby avoiding placement of a power transformer and other auxiliary power components in the cart 11, resulting in a smaller, more moveable cart 11.

The tower 30 may also include support equipment for the sensors deployed throughout the robotic system 10. For example, the tower 30 may include opto-electronics equipment for detecting, receiving, and processing data received from the optical sensors or cameras throughout the robotic system 10. In combination with the control system, such opto-electronics equipment may be used to generate real-time images for display in any number of consoles deployed throughout the system, including in the tower 30. Similarly, the tower 30 may also include an electronic subsystem for receiving and processing signals received from deployed electromagnetic (EM) sensors. The tower 30 may also be used to house and position an EM field generator for detection by EM sensors in or on the medical instrument.

The tower 30 may also include a console 31 in addition to other consoles available in the rest of the system, e.g., console mounted on top of the cart. The console 31 may include a user interface and a display screen, such as a touchscreen, for the physician operator. Consoles in system 10 are generally designed to provide both robotic controls as well as pre-operative and real-time information of the procedure, such as navigational and localization information of the endoscope 13. When the console 31 is not the only console available to the physician, it may be used by a second operator, such as a nurse, to monitor the health or vitals of the patient and the operation of system, as well as provide procedure-specific data, such as navigational and localization information. In other embodiments, the console 31 is housed in a body that is separate from the tower 30.

The tower 30 may be coupled to the cart 11 and endoscope 13 through one or more cables or connections (not shown). In some embodiments, the support functionality from the tower 30 may be provided through a single cable to the cart 11, simplifying and de-cluttering the operating room. In other embodiments, specific functionality may be coupled in separate cabling and connections. For example, while power may be provided through a single power cable to the cart, the support for controls, optics, fluidics, and/or navigation may be provided through a separate cable.

FIG. 2 provides a detailed illustration of an embodiment of the cart from the cart-based robotically-enabled system shown in FIG. 1. The cart 11 generally includes an elongated support structure 14 (often referred to as a "column"), a cart base 15, and a console 16 at the top of the column 14. The column 14 may include one or more carriages, such as a carriage 17 (alternatively "arm support") for supporting the deployment of one or more robotic arms 12 (three shown in FIG. 2). The carriage 17 may include individually configurable arm mounts that rotate along a perpendicular axis to adjust the base of the robotic arms 12 for better positioning relative to the patient. The carriage 17 also includes a carriage interface 19 that allows the carriage 17 to vertically translate along the column 14.

The carriage interface 19 is connected to the column 14 through slots, such as slot 20, that are positioned on opposite sides of the column 14 to guide the vertical translation of the carriage 17. The slot 20 contains a vertical translation interface to position and hold the carriage at various vertical heights relative to the cart base 15. Vertical translation of the carriage 17 allows the cart 11 to adjust the reach of the robotic arms 12 to meet a variety of table heights, patient sizes, and physician preferences. Similarly, the individually configurable arm mounts on the carriage 17 allow the robotic arm base 21 of robotic arms 12 to be angled in a variety of configurations.

In some embodiments, the slot 20 may be supplemented with slot covers that are flush and parallel to the slot surface to prevent dirt and fluid ingress into the internal chambers of the column 14 and the vertical translation interface as the carriage 17 vertically translates. The slot covers may be deployed through pairs of spring spools positioned near the vertical top and bottom of the slot 20. The covers are coiled within the spools until deployed to extend and retract from their coiled state as the carriage 17 vertically translates up and down. The spring-loading of the spools provides force to retract the cover into a spool when carriage 17 translates towards the spool, while also maintaining a tight seal when the carriage 17 translates away from the spool. The covers may be connected to the carriage 17 using, for example, brackets in the carriage interface 19 to ensure proper extension and retraction of the cover as the carriage 17 translates.

The column 14 may internally comprise mechanisms, such as gears and motors, that are designed to use a vertically aligned lead screw to translate the carriage 17 in a mechanized fashion in response to control signals generated in response to user inputs, e.g., inputs from the console 16.

The robotic arms 12 may generally comprise robotic arm bases 21 and end effectors 22, separated by a series of linkages 23 that are connected by a series of joints 24, each joint comprising an independent actuator, each actuator comprising an independently controllable motor. Each independently controllable joint represents an independent degree of freedom available to the robotic arm. Each of the arms 12 have seven joints, and thus provide seven degrees of freedom. A multitude of joints result in a multitude of degrees of freedom, allowing for "redundant" degrees of freedom. Redundant degrees of freedom allow the robotic arms 12 to position their respective end effectors 22 at a specific position, orientation, and trajectory in space using different linkage positions and joint angles. This allows for the system to position and direct a medical instrument from a desired point in space while allowing the physician to move the arm joints into a clinically advantageous position away from the patient to create greater access, while avoiding arm collisions.

The cart base 15 balances the weight of the column 14, carriage 17, and arms 12 over the floor. Accordingly, the cart base 15 houses heavier components, such as electronics, motors, power supply, as well as components that either enable movement and/or immobilize the cart. For example, the cart base 15 includes rollable wheel-shaped casters 25 that allow for the cart to easily move around the room prior to a procedure. After reaching the appropriate position, the casters 25 may be immobilized using wheel locks to hold the cart 11 in place during the procedure.

Positioned at the vertical end of column 14, the console 16 allows for both a user interface for receiving user input and a display screen (or a dual-purpose device such as, for example, a touchscreen 26) to provide the physician user with both pre-operative and intra-operative data. Potential pre-operative data on the touchscreen 26 may include pre-operative plans, navigation and mapping data derived from pre-operative computerized tomography (CT) scans, and/or notes from pre-operative patient interviews. Intra-operative data on display may include optical information provided from the tool, sensor and coordinate information from sensors, as well as vital patient statistics, such as respiration, heart rate, and/or pulse. The console 16 may be positioned and tilted to allow a physician to access the console from the side of the column 14 opposite carriage 17. From this position, the physician may view the console 16, robotic arms 12, and patient while operating the console 16 from behind the cart 11. As shown, the console 16 also includes a handle 27 to assist with maneuvering and stabilizing cart 11.

Figure 3:
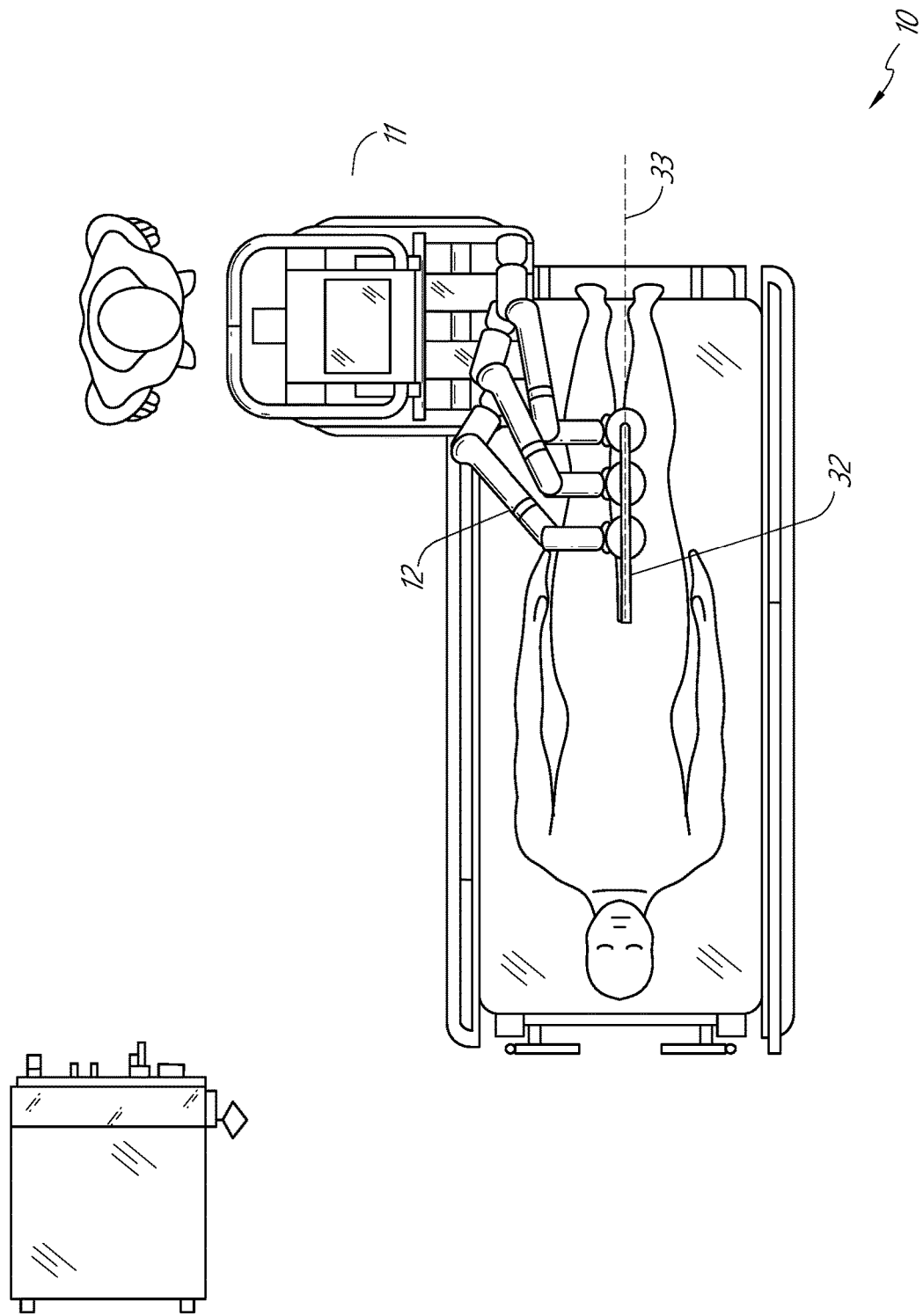
FIG. 3 illustrates an embodiment of the robotic system of FIG. 1 arranged for ureteroscopy.

FIG. 3 illustrates an embodiment of a robotically-enabled system 10 arranged for ureteroscopy. In a ureteroscopic procedure, the cart 11 may be positioned to deliver a ureteroscope 32, a procedure-specific endoscope designed to traverse a patient's urethra and ureter, to the lower abdominal area of the patient. In a ureteroscopy, it may be desirable for the ureteroscope 32 to be directly aligned with the patient's urethra to reduce friction and forces on the sensitive anatomy in the area. As shown, the cart 11 may be aligned at the foot of the table to allow the robotic arms 12 to position the ureteroscope 32 for direct linear access to the patient's urethra. From the foot of the table, the robotic arms 12 may insert the ureteroscope 32 along the virtual rail 33 directly into the patient's lower abdomen through the urethra.

After insertion into the urethra, using similar control techniques as in bronchoscopy, the ureteroscope 32 may be navigated into the bladder, ureters, and/or kidneys for diagnostic and/or therapeutic applications. For example, the ureteroscope 32 may be directed into the ureter and kidneys to break up kidney stone build up using a laser or ultrasonic lithotripsy device deployed down the working channel of the ureteroscope 32. After lithotripsy is complete, the resulting stone fragments may be removed using baskets deployed down the ureteroscope 32.

Figure 4:
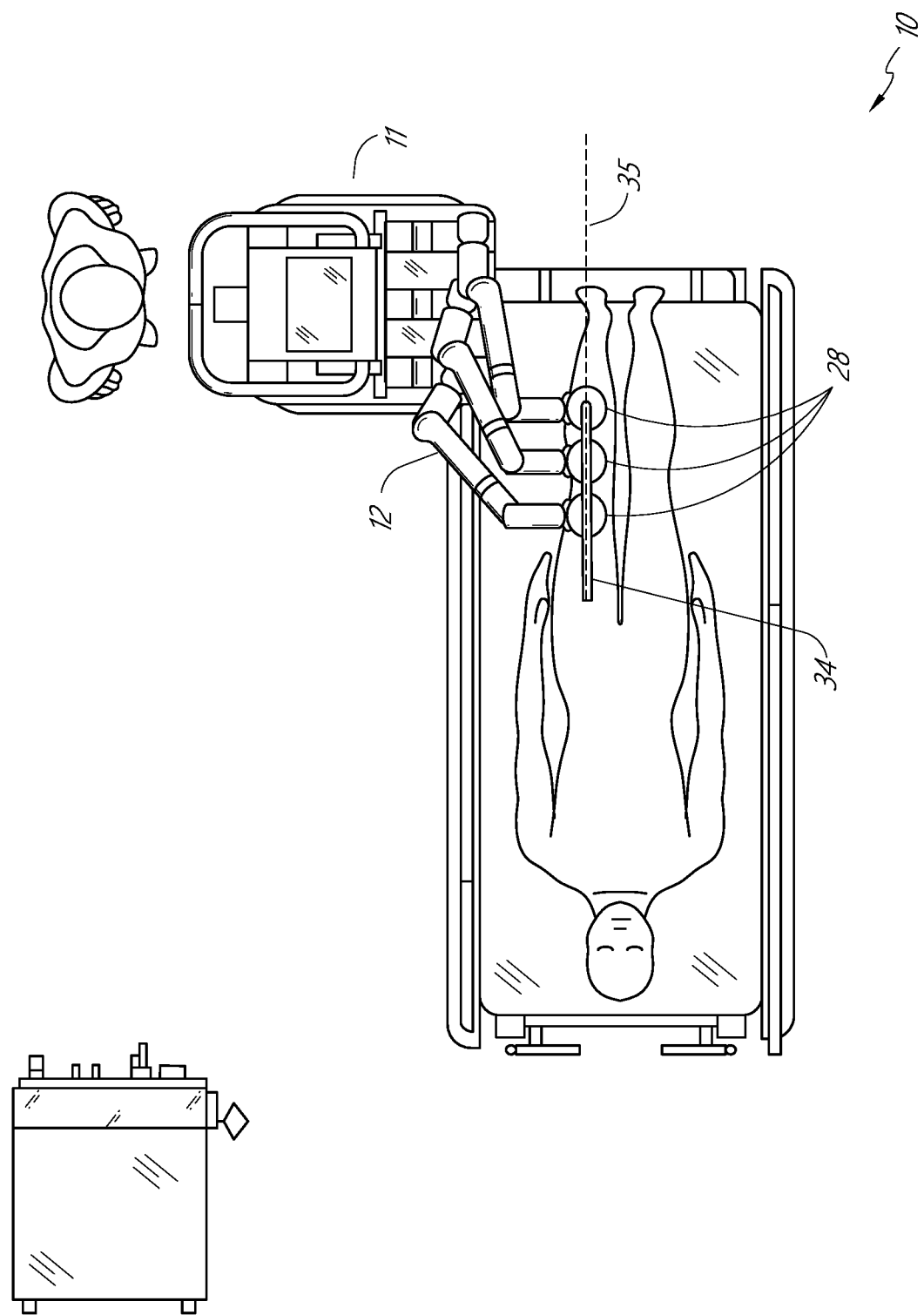
FIG. 4 illustrates an embodiment of the robotic system of FIG. 1 arranged for a vascular procedure.

FIG. 4 illustrates an embodiment of a robotically-enabled system similarly arranged for a vascular procedure. In a vascular procedure, the system 10 may be configured such that the cart 11 may deliver a medical instrument 34, such as a steerable catheter, to an access point in the femoral artery in the patient's leg. The femoral artery presents both a larger diameter for navigation as well as a relatively less circuitous and tortuous path to the patient's heart, which simplifies navigation. As in a ureteroscopic procedure, the cart 11 may be positioned towards the patient's legs and lower abdomen to allow the robotic arms 12 to provide a virtual rail 35 with direct linear access to the femoral artery access point in the patient's thigh/hip region. After insertion into the artery, the medical instrument 34 may be directed and inserted by translating the instrument drivers 28. Alternatively, the cart may be positioned around the patient's upper abdomen in order to reach alternative vascular access points, such as, for example, the carotid and brachial arteries near the shoulder and wrist.

B. Robotic System—Table

Figure 5:
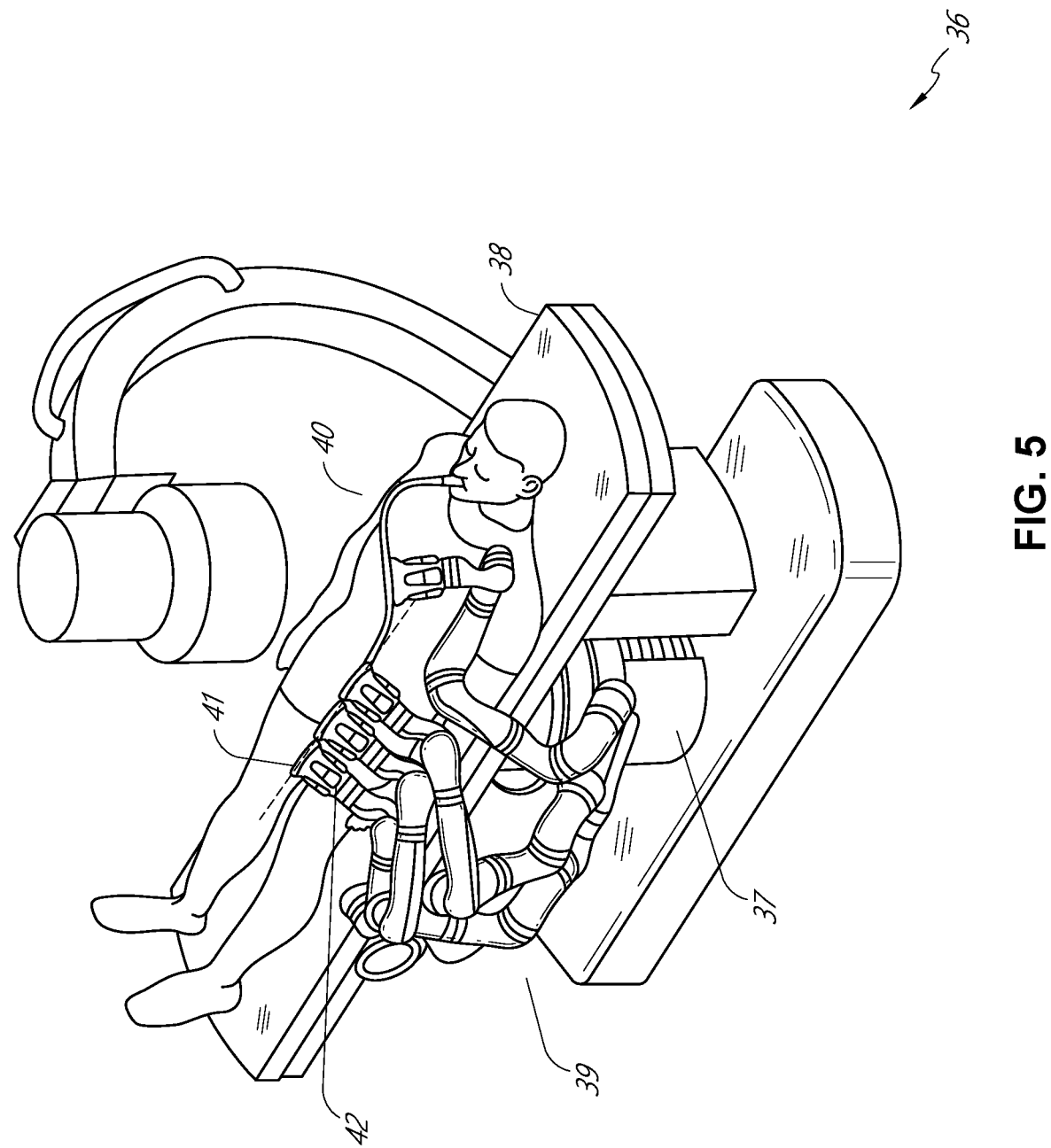
FIG. 5 illustrates an embodiment of a table-based robotic system arranged for a bronchoscopy procedure.

Embodiments of the robotically-enabled medical system may also incorporate the patient's table. Incorporation of the table reduces the amount of capital equipment within the operating room by removing the cart, which allows greater access to the patient. FIG. 5 illustrates an embodiment of such a robotically-enabled system arranged for a bronchoscopy procedure. System 36 includes a support structure or column 37 for supporting platform 38 (shown as a "table" or "bed") over the floor. Much like in the cart-based systems, the end effectors of the robotic arms 39 of the system 36 comprise instrument drivers 42 that are designed to manipulate an elongated medical instrument, such as a bronchoscope 40 in FIG. 5, through or along a virtual rail 41 formed from the linear alignment of the instrument drivers 42. In practice, a C-arm for providing fluoroscopic imaging may be positioned over the patient's upper abdominal area by placing the emitter and detector around table 38.

Figure 6:
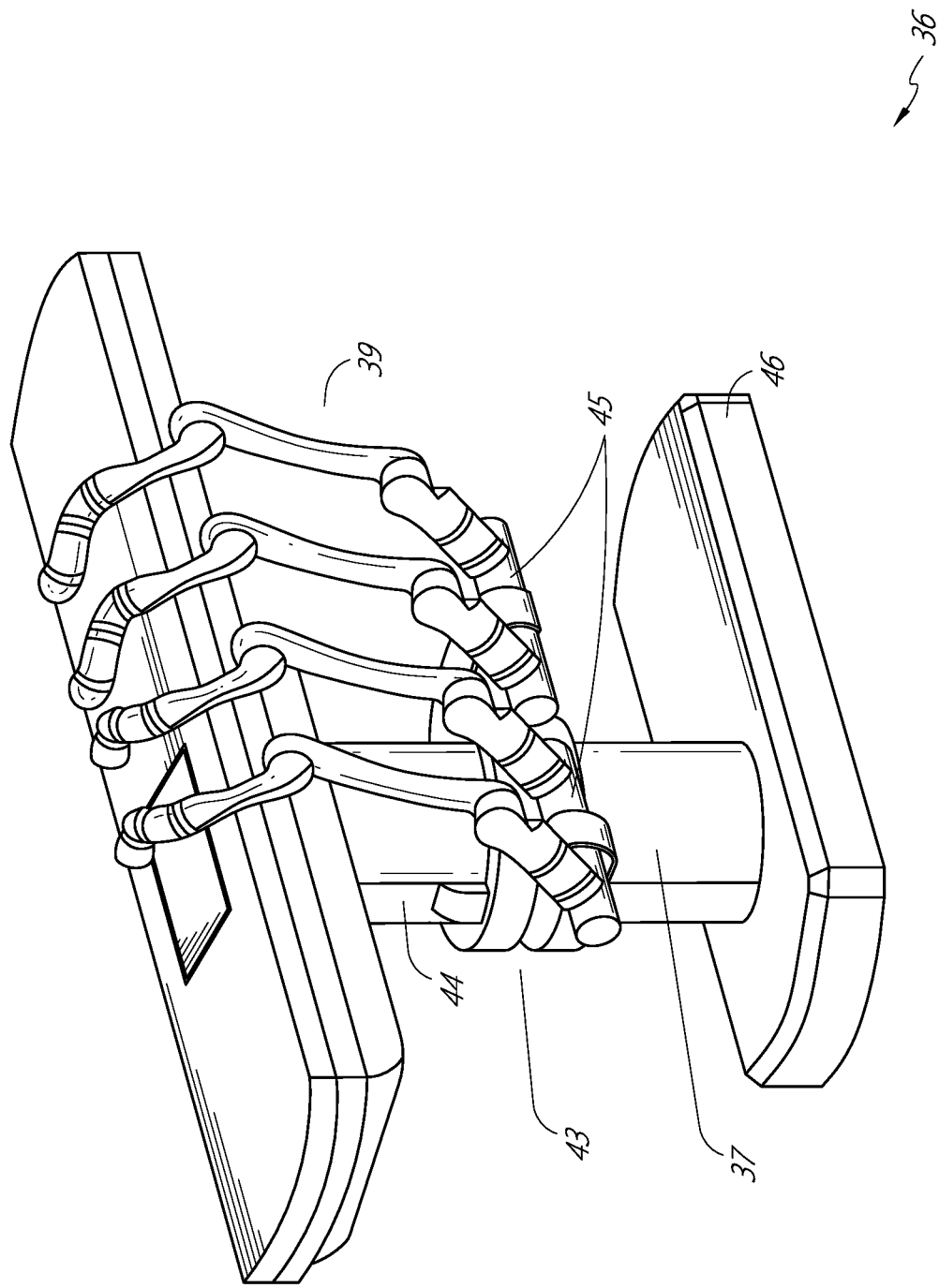
FIG. 6 provides an alternative view of the robotic system of FIG. 5.

FIG. 6 provides an alternative view of the system 36 without the patient and medical instrument for discussion purposes. As shown, the column 37 may include one or more carriages 43 shown as ring-shaped in the system 36, from which the one or more robotic arms 39 may be based. The carriages 43 may translate along a vertical column interface 44 that runs the length of the column 37 to provide different vantage points from which the robotic arms 39 may be positioned to reach the patient. The carriage(s) 43 may rotate around the column 37 using a mechanical motor positioned within the column 37 to allow the robotic arms 39 to have access to multiples sides of the table 38, such as, for example, both sides of the patient. In embodiments with multiple carriages, the carriages may be individually positioned on the column and may translate and/or rotate independent of the other carriages. While carriages 43 need not surround the column 37 or even be circular, the ring-shape as shown facilitates rotation of the carriages 43 around the column 37 while maintaining structural balance. Rotation and translation of the carriages 43 allows the system to align the medical instruments, such as endoscopes and laparoscopes, into different access points on the patient. In other embodiments (not shown), the system 36 can include a patient table or bed with adjustable arm supports in the form of bars or rails extending alongside it. One or more robotic arms 39 (e.g., via a shoulder with an elbow joint) can be attached to the adjustable arm supports, which can be vertically adjusted. By providing vertical adjustment, the robotic arms 39 are advantageously capable of being stowed compactly beneath the patient table or bed, and subsequently raised during a procedure.

Figure 9:
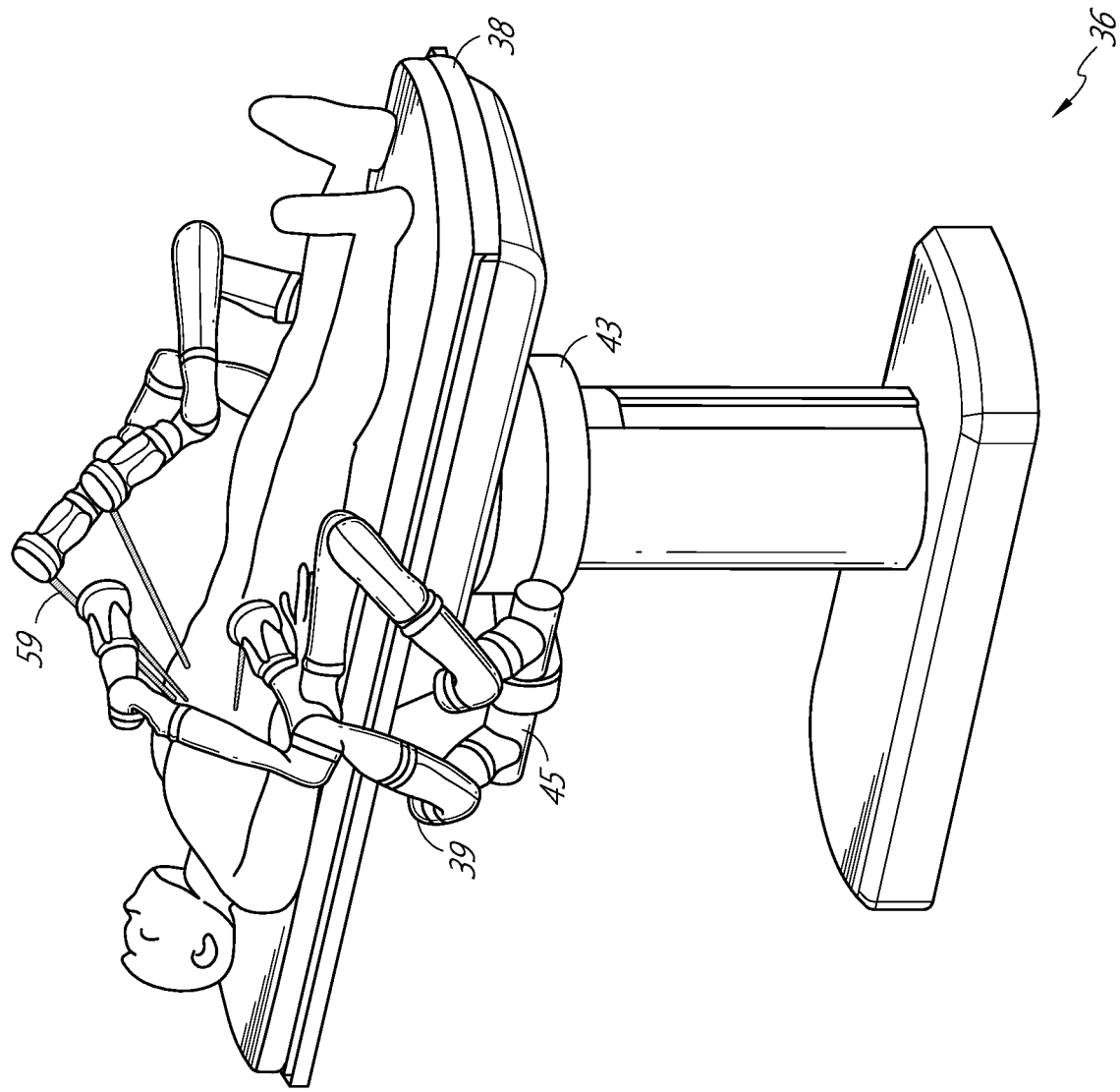
FIG. 9 illustrates an embodiment of a table-based robotic system configured for a laparoscopic procedure.

The arms 39 may be mounted on the carriages through a set of arm mounts 45 comprising a series of joints that may individually rotate and/or telescopically extend to provide additional configurability to the robotic arms 39. Additionally, the arm mounts 45 may be positioned on the carriages 43 such that, when the carriages 43 are appropriately rotated, the arm mounts 45 may be positioned on either the same side of table 38 (as shown in FIG. 6), on opposite sides of table 38 (as shown in FIG. 9), or on adjacent sides of the table 38 (not shown).

The column 37 structurally provides support for the table 38, and a path for vertical translation of the carriages. Internally, the column 37 may be equipped with lead screws for guiding vertical translation of the carriages, and motors to mechanize the translation of said carriages based the lead screws. The column 37 may also convey power and control signals to the carriage 43 and robotic arms 39 mounted thereon.

The table base 46 serves a similar function as the cart base 15 in cart 11 shown in FIG. 2, housing heavier components to balance the table/bed 38, the column 37, the carriages 43, and the robotic arms 39. The table base 46 may also incorporate rigid casters to provide stability during procedures. Deployed from the bottom of the table base 46, the casters may extend in opposite directions on both sides of the base 46 and retract when the system 36 needs to be moved.

Continuing with FIG. 6, the system 36 may also include a tower (not shown) that divides the functionality of system 36 between table and tower to reduce the form factor and bulk of the table. As in earlier disclosed embodiments, the tower may provide a variety of support functionalities to table, such as processing, computing, and control capabilities, power, fluidics, and/or optical and sensor processing. The tower may also be movable to be positioned away from the patient to improve physician access and de-clutter the operating room. Additionally, placing components in the tower allows for more storage space in the table base for potential stowage of the robotic arms. The tower may also include a master controller or console that provides both a user interface for user input, such as keyboard and/or pendant, as well as a display screen (or touchscreen) for pre-operative and intra-operative information, such as real-time imaging, navigation, and tracking information. In some embodiments, the tower may also contain holders for gas tanks to be used for insufflation.

Figure 7:
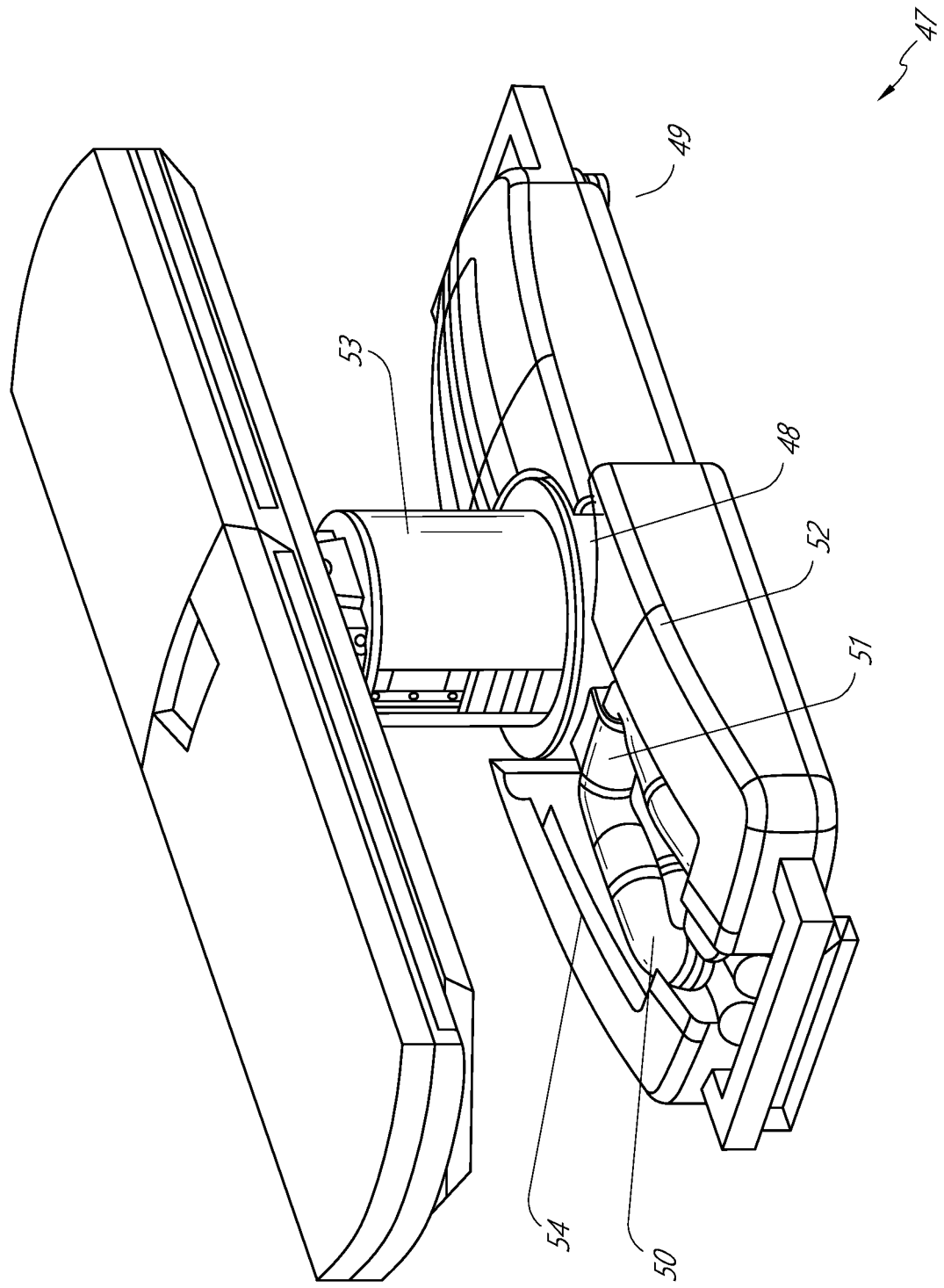
FIG. 7 illustrates an example system configured to stow robotic arm(s).

In some embodiments, a table base may stow and store the robotic arms when not in use. FIG. 7 illustrates a system 47 that stows robotic arms in an embodiment of the table-based system. In system 47, carriages 48 may be vertically translated into base 49 to stow robotic arms 50, arm mounts 51, and the carriages 48 within the base 49. Base covers 52 may be translated and retracted open to deploy the carriages 48, arm mounts 51, and arms 50 around column 53, and closed to stow to protect them when not in use. The base covers 52 may be sealed with a membrane 54 along the edges of its opening to prevent dirt and fluid ingress when closed.

Figure 8:
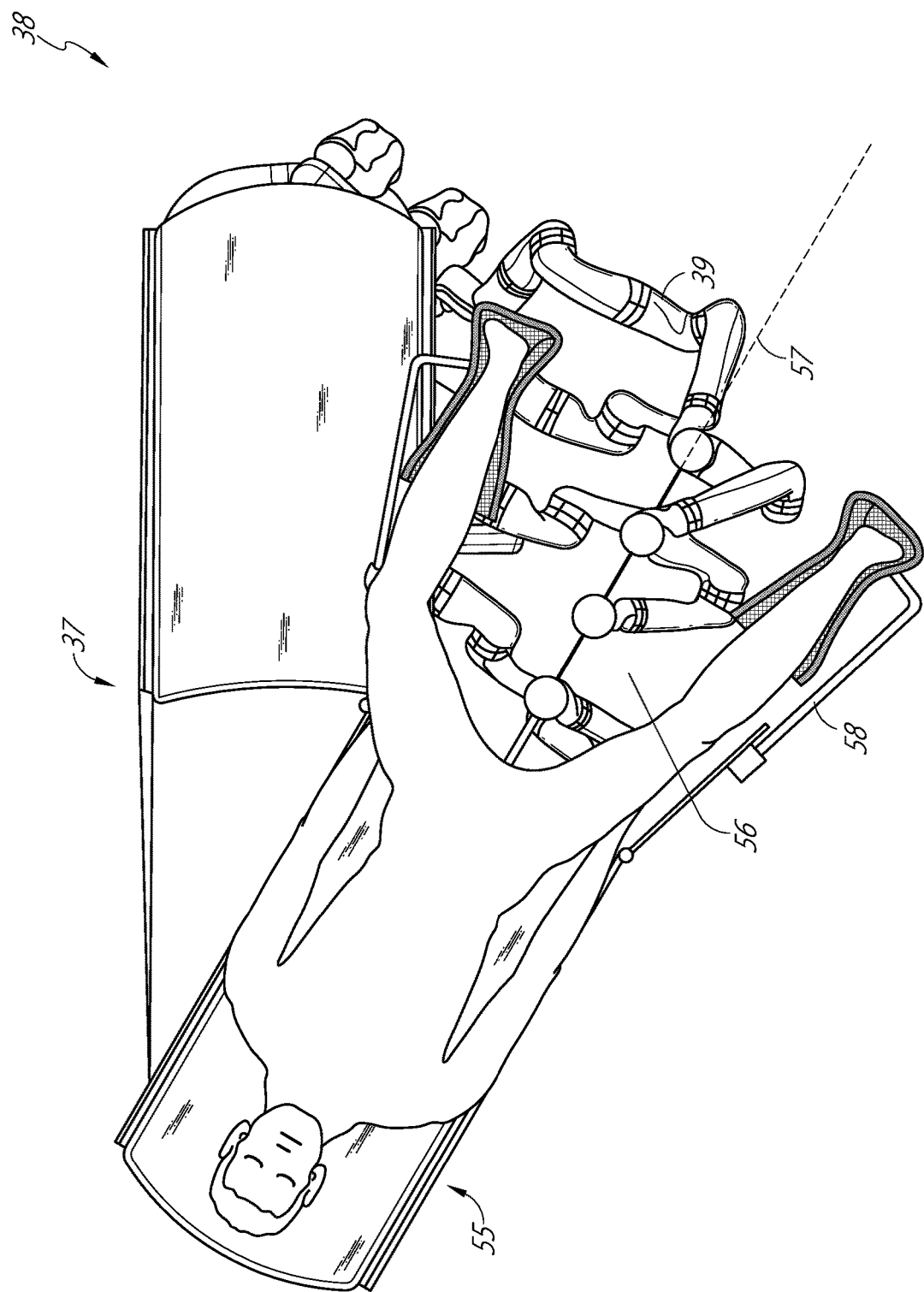
FIG. 8 illustrates an embodiment of a table-based robotic system configured for a ureteroscopy procedure.

FIG. 8 illustrates an embodiment of a robotically-enabled table-based system configured for a ureteroscopy procedure. In a ureteroscopy, the table 38 may include a swivel portion 55 for positioning a patient off-angle from the column 37 and table base 46. The swivel portion 55 may rotate or pivot around a pivot point (e.g., located below the patient's head) in order to position the bottom portion of the swivel portion 55 away from the column 37. For example, the pivoting of the swivel portion 55 allows a C-arm (not shown) to be positioned over the patient's lower abdomen without competing for space with the column (not shown) below table 38. By rotating the carriage (not shown) around the column 37, the robotic arms 39 may directly insert a ureteroscope 56 along a virtual rail 57 into the patient's groin area to reach the urethra. In a ureteroscopy, stirrups 58 may also be fixed to the swivel portion 55 of the table 38 to support the position of the patient's legs during the procedure and allow clear access to the patient's groin area.

In a laparoscopic procedure, through small incision(s) in the patient's abdominal wall, minimally invasive instruments may be inserted into the patient's anatomy. In some embodiments, the minimally invasive instruments comprise an elongated rigid member, such as a shaft, which is used to access anatomy within the patient. After inflation of the patient's abdominal cavity, the instruments may be directed to perform surgical or medical tasks, such as grasping, cutting, ablating, suturing, etc. In some embodiments, the instruments can comprise a scope, such as a laparoscope. FIG. 9 illustrates an embodiment of a robotically-enabled table-based system configured for a laparoscopic procedure. As shown in FIG. 9, the carriages 43 of the system 36 may be rotated and vertically adjusted to position pairs of the robotic arms 39 on opposite sides of the table 38, such that instrument 59 may be positioned using the arm mounts 45 to be passed through minimal incisions on both sides of the patient to reach his/her abdominal cavity.

Figure 10:
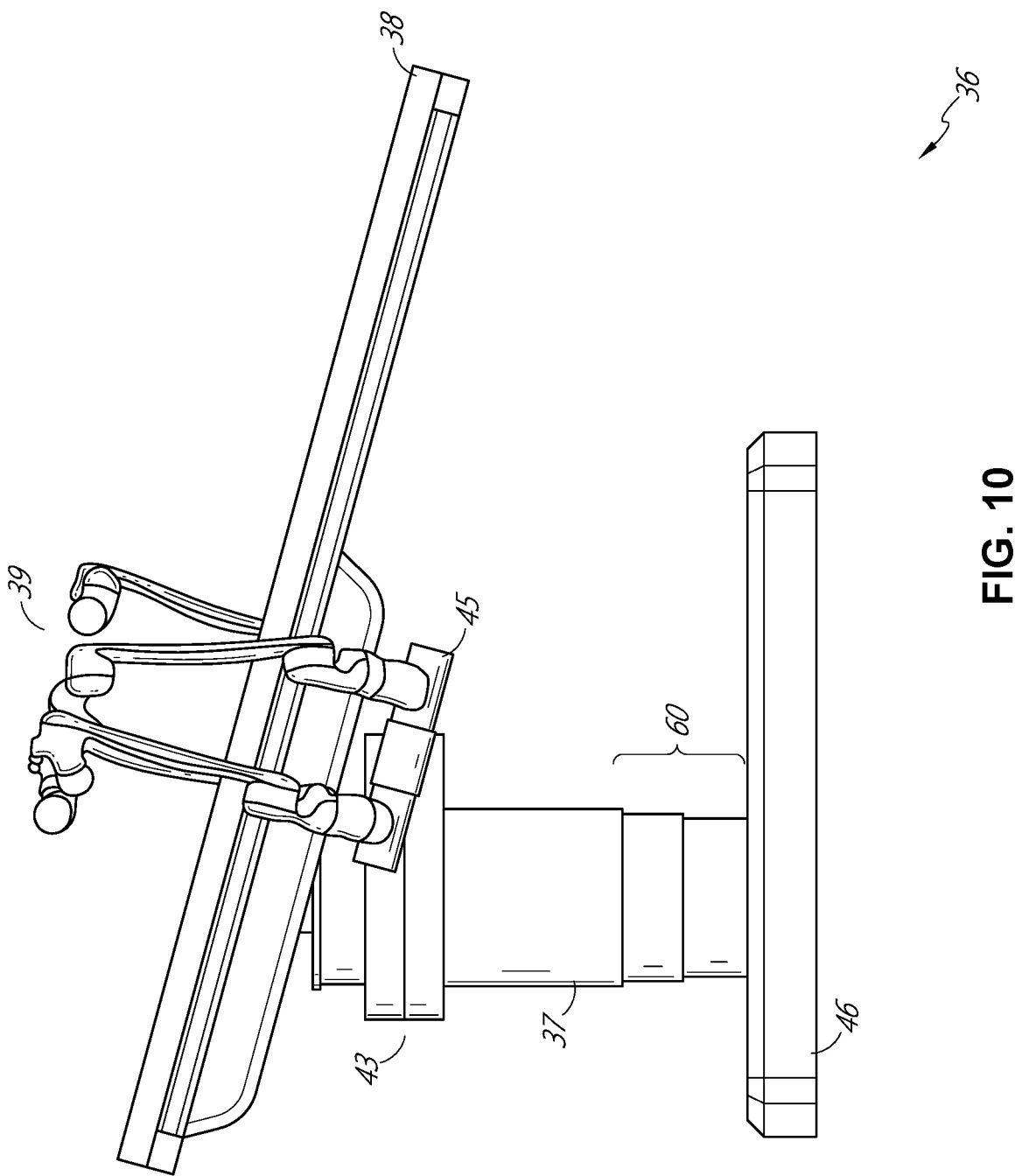
FIG. 10 illustrates an embodiment of the table-based robotic system of FIGS. 5-9 with pitch or tilt adjustment.

To accommodate laparoscopic procedures, the robotically-enabled table system may also tilt the platform to a desired angle. FIG. 10 illustrates an embodiment of the robotically-enabled medical system with pitch or tilt adjustment. As shown in FIG. 10, the system 36 may accommodate tilt of the table 38 to position one portion of the table at a greater distance from the floor than the other. Additionally, the arm mounts 45 may rotate to match the tilt such that the arms 39 maintain the same planar relationship with table 38. To accommodate steeper angles, the column 37 may also include telescoping portions 60 that allow vertical extension of column 37 to keep the table 38 from touching the floor or colliding with base 46.

Figure 11:
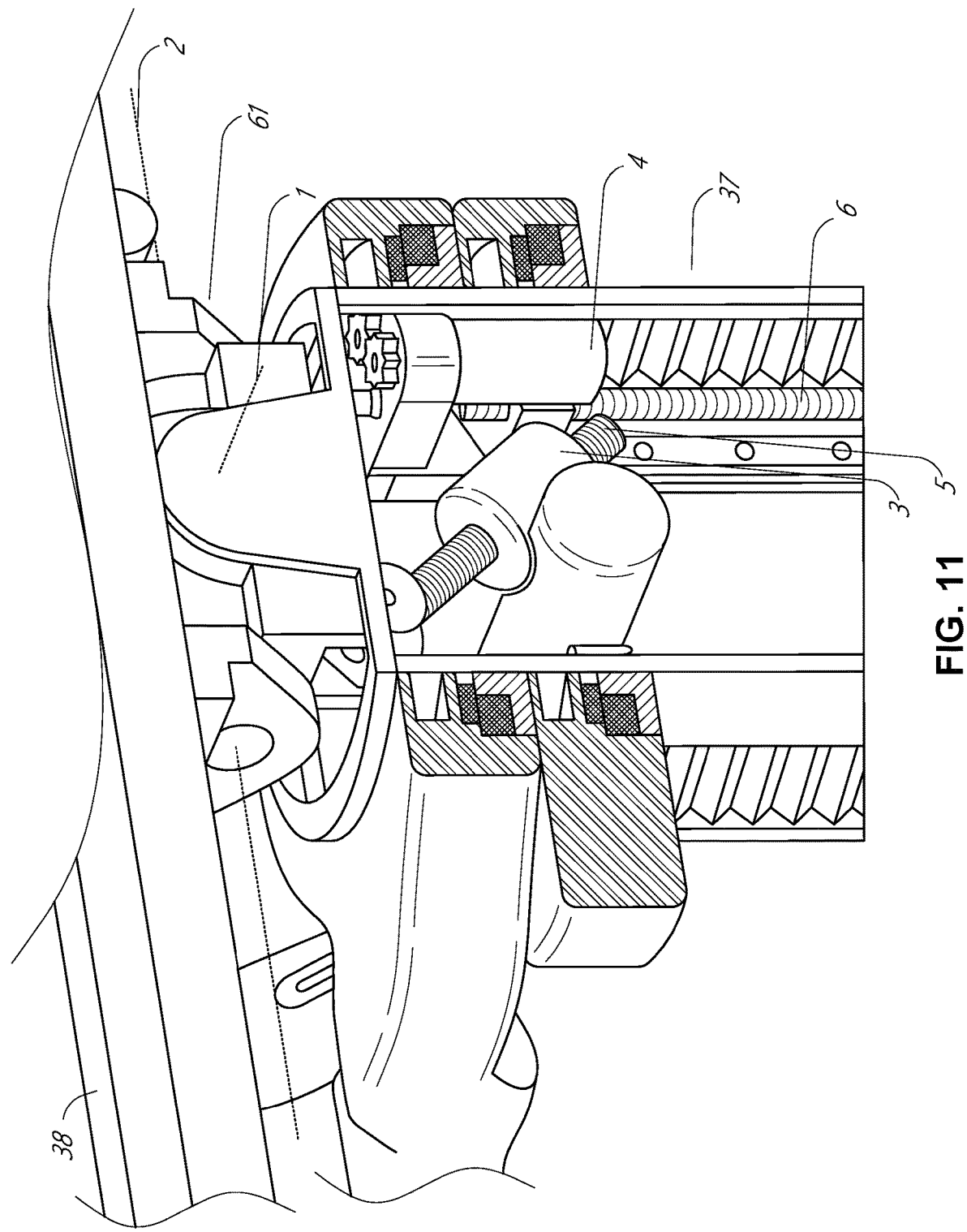
FIG. 11 provides a detailed illustration of the interface between the table and the column of the table-based robotic system of FIGS. 5-10.

FIG. 11 provides a detailed illustration of the interface between the table 38 and the column 37. Pitch rotation mechanism 61 may be configured to alter the pitch angle of the table 38 relative to the column 37 in multiple degrees of freedom. The pitch rotation mechanism 61 may be enabled by the positioning of orthogonal axes 1, 2 at the column-table interface, each axis actuated by a separate motor 3, 4 responsive to an electrical pitch angle command. Rotation along one screw 5 would enable tilt adjustments in one axis 1, while rotation along the other screw 6 would enable tilt adjustments along the other axis 2. In some embodiments, a ball joint can be used to alter the pitch angle of the table 38 relative to the column 37 in multiple degrees of freedom.

For example, pitch adjustments are particularly useful when trying to position the table in a Trendelenburg position, i.e., position the patient's lower abdomen at a higher position from the floor than the patient's lower abdomen, for lower abdominal surgery. The Trendelenburg position causes the patient's internal organs to slide towards his/her upper abdomen through the force of gravity, clearing out the abdominal cavity for minimally invasive tools to enter and perform lower abdominal surgical or medical procedures, such as laparoscopic prostatectomy.

Figure 12:
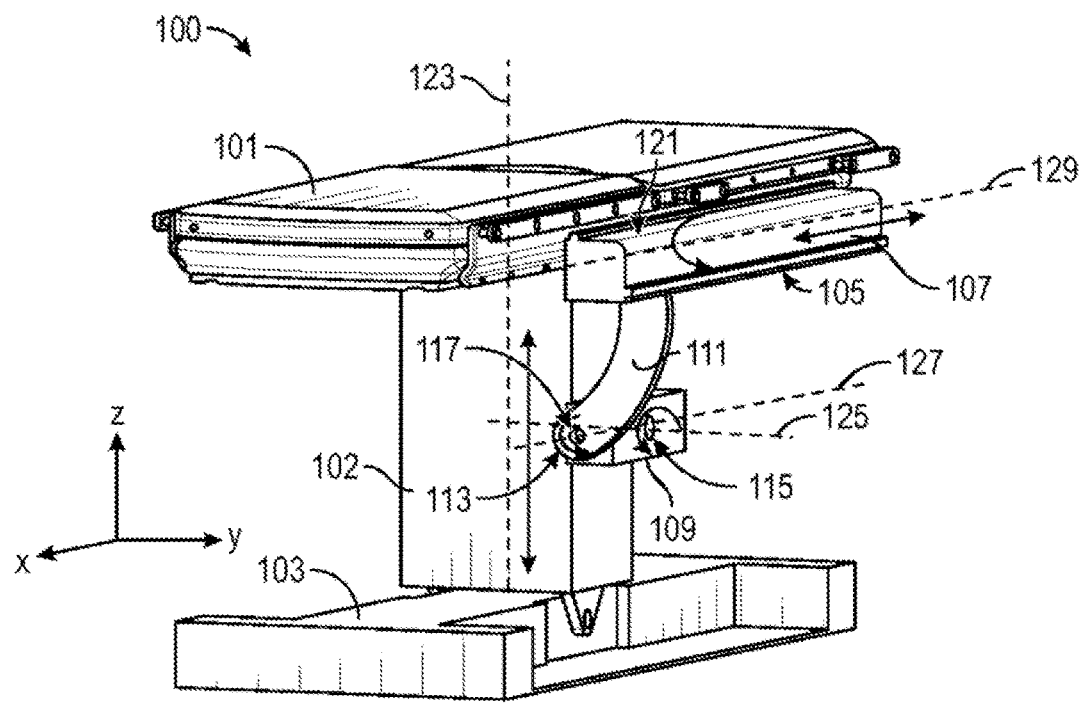
FIG. 12 illustrates an alternative embodiment of a table-based robotic system.
Figure 13:
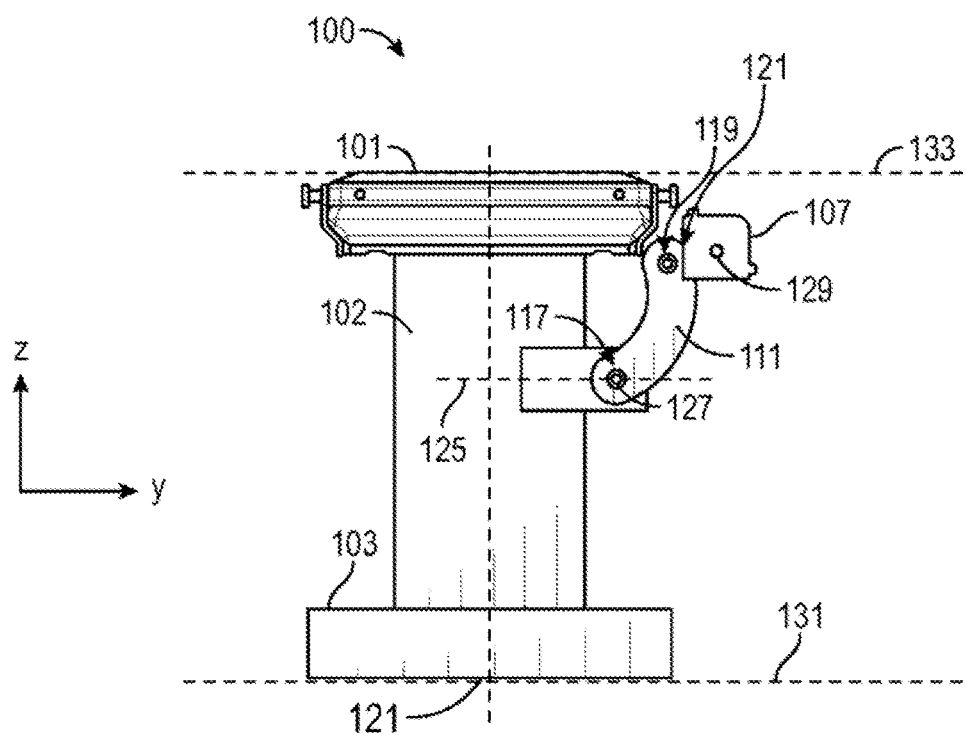
FIG. 13 illustrates an end view of the table-based robotic system of FIG. 12.

FIGS. 12 and 13 illustrate isometric and end views of an alternative embodiment of a table-based surgical robotics system 100. The surgical robotics system 100 includes one or more adjustable arm supports 105 that can be configured to support one or more robotic arms (see, for example, FIG. 14) relative to a table 101. In the illustrated embodiment, a single adjustable arm support 105 is shown, though an additional arm support can be provided on an opposite side of the table 101. The adjustable arm support 105 can be configured so that it can move relative to the table 101 to adjust and/or vary the position of the adjustable arm support 105 and/or any robotic arms mounted thereto relative to the table 101. For example, the adjustable arm support 105 may be adjusted one or more degrees of freedom relative to the table 101. The adjustable arm support 105 provides high versatility to the system 100, including the ability to easily stow the one or more adjustable arm supports 105 and any robotics arms attached thereto beneath the table 101. The adjustable arm support 105 can be elevated from the stowed position to a position below an upper surface of the table 101. In other embodiments, the adjustable arm support 105 can be elevated from the stowed position to a position above an upper surface of the table 101.

The adjustable arm support 105 can provide several degrees of freedom, including lift, lateral translation, tilt, etc. In the illustrated embodiment of FIGS. 12 and 13, the arm support 105 is configured with four degrees of freedom, which are illustrated with arrows in FIG. 12. A first degree of freedom allows for adjustment of the adjustable arm support 105 in the z-direction ("Z-lift"). For example, the adjustable arm support 105 can include a carriage 109 configured to move up or down along or relative to a column 102 supporting the table 101. A second degree of freedom can allow the adjustable arm support 105 to tilt. For example, the adjustable arm support 105 can include a rotary joint, which can allow the adjustable arm support 105 to be aligned with the bed in a Trendelenburg position. A third degree of freedom can allow the adjustable arm support 105 to "pivot up," which can be used to adjust a distance between a side of the table 101 and the adjustable arm support 105. A fourth degree of freedom can permit translation of the adjustable arm support 105 along a longitudinal length of the table.

The surgical robotics system 100 in FIGS. 12 and 13 can comprise a table supported by a column 102 that is mounted to a base 103. The base 103 and the column 102 support the table 101 relative to a support surface. A floor axis 131 and a support axis 133 are shown in FIG. 13.

The adjustable arm support 105 can be mounted to the column 102. In other embodiments, the arm support 105 can be mounted to the table 101 or base 103. The adjustable arm support 105 can include a carriage 109, a bar or rail connector 111 and a bar or rail 107. In some embodiments, one or more robotic arms mounted to the rail 107 can translate and move relative to one another.

The carriage 109 can be attached to the column 102 by a first joint 113, which allows the carriage 109 to move relative to the column 102 (e.g., such as up and down a first or vertical axis 123). The first joint 113 can provide the first degree of freedom ("Z-lift") to the adjustable arm support 105. The adjustable arm support 105 can include a second joint 115, which provides the second degree of freedom (tilt) for the adjustable arm support 105. The adjustable arm support 105 can include a third joint 117, which can provide the third degree of freedom ("pivot up") for the adjustable arm support 105. An additional joint 119 (shown in FIG. 13) can be provided that mechanically constrains the third joint 117 to maintain an orientation of the rail 107 as the rail connector 111 is rotated about a third axis 127. The adjustable arm support 105 can include a fourth joint 121, which can provide a fourth degree of freedom (translation) for the adjustable arm support 105 along a fourth axis 129.

Figure 14:
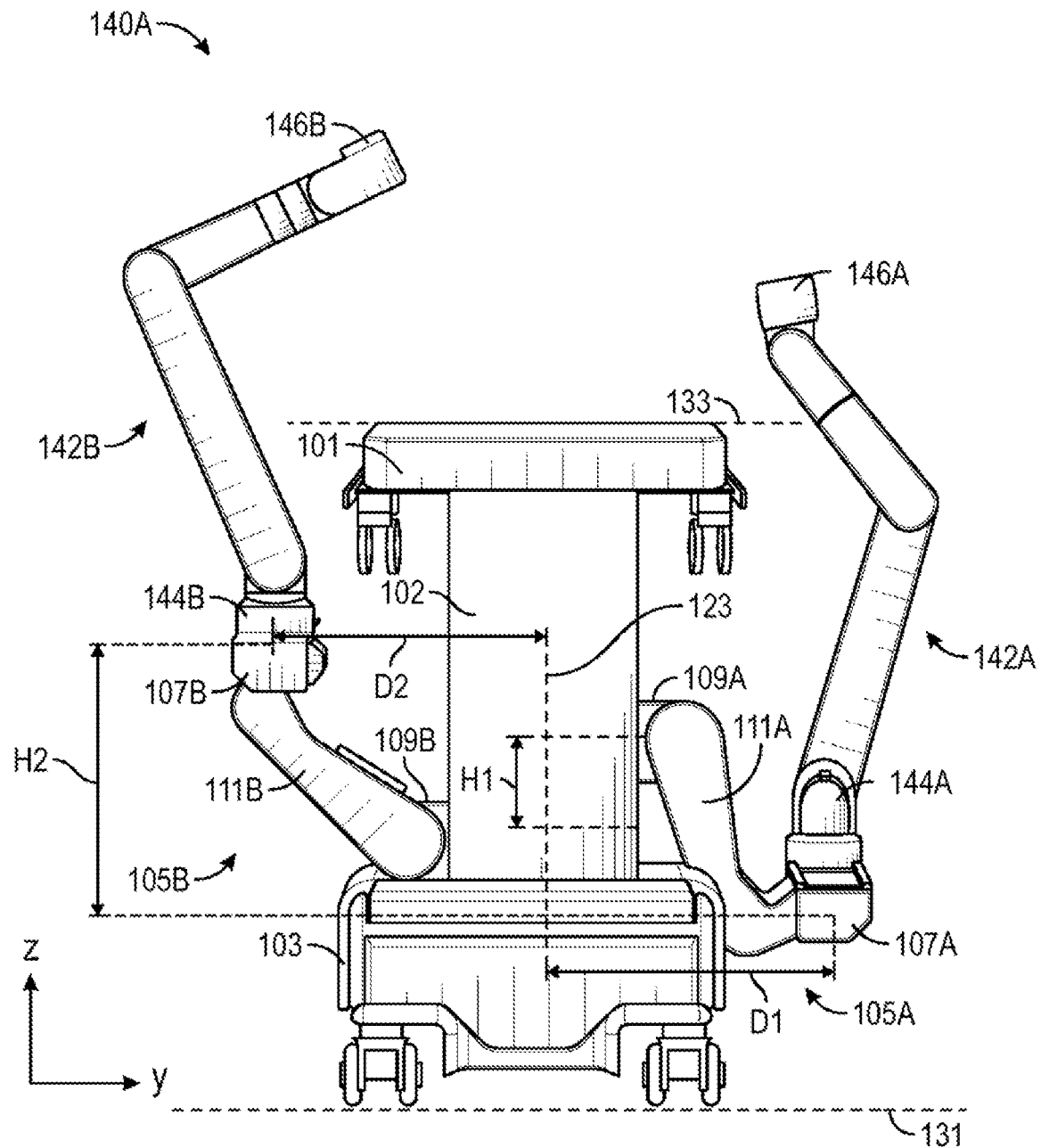
FIG. 14 illustrates an end view of a table-based robotic system with robotic arms attached thereto.

FIG. 14 illustrates an end view of the surgical robotics system 140A with two adjustable arm supports 105A, 105B mounted on opposite sides of a table 101. A first robotic arm 142A is attached to the bar or rail 107A of the first adjustable arm support 105B. The first robotic arm 142A includes a base 144A attached to the rail 107A. The distal end of the first robotic arm 142A includes an instrument drive mechanism 146A that can attach to one or more robotic medical instruments or tools. Similarly, the second robotic arm 142B includes a base 144B attached to the rail 107B. The distal end of the second robotic arm 142B includes an instrument drive mechanism 146B. The instrument drive mechanism 146B can be configured to attach to one or more robotic medical instruments or tools.

In some embodiments, one or more of the robotic arms 142A, 142B comprises an arm with seven or more degrees of freedom. In some embodiments, one or more of the robotic arms 142A, 142B can include eight degrees of freedom, including an insertion axis (1-degree of freedom including insertion), a wrist (3-degrees of freedom including wrist pitch, yaw and roll), an elbow (1-degree of freedom including elbow pitch), a shoulder (2-degrees of freedom including shoulder pitch and yaw), and base 144A, 144B (1-degree of freedom including translation). In some embodiments, the insertion degree of freedom can be provided by the robotic arm 142A, 142B, while in other embodiments, the instrument itself provides insertion via an instrument-based insertion architecture.

C. Instrument Driver & Interface

The end effectors of the system's robotic arms comprise (i) an instrument driver (alternatively referred to as "instrument drive mechanism" or "instrument device manipulator") that incorporate electro-mechanical means for actuating the medical instrument and (ii) a removable or detachable medical instrument, which may be devoid of any electro-mechanical components, such as motors. This dichotomy may be driven by the need to sterilize medical instruments used in medical procedures, and the inability to adequately sterilize expensive capital equipment due to their intricate mechanical assemblies and sensitive electronics. Accordingly, the medical instruments may be designed to be detached, removed, and interchanged from the instrument driver (and thus the system) for individual sterilization or disposal by the physician or the physician's staff In contrast, the instrument drivers need not be changed or sterilized, and may be draped for protection.

Figure 15:
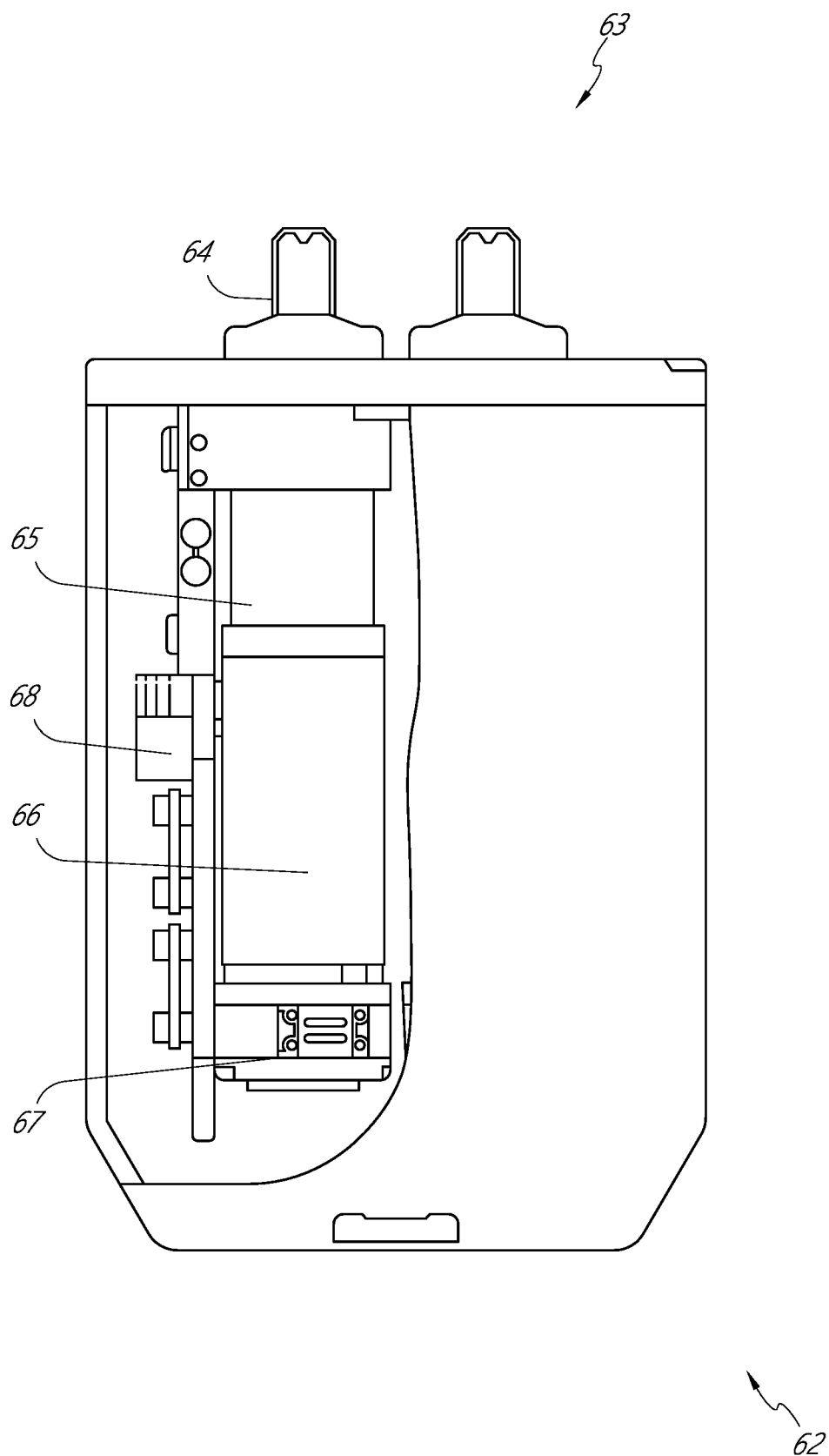
FIG. 15 illustrates an exemplary instrument driver.

FIG. 15 illustrates an example instrument driver. Positioned at the distal end of a robotic arm, instrument driver 62 comprises of one or more drive units 63 arranged with parallel axes to provide controlled torque to a medical instrument via drive shafts 64. Each drive unit 63 comprises an individual drive shaft 64 for interacting with the instrument, a gear head 65 for converting the motor shaft rotation to a desired torque, a motor 66 for generating the drive torque, an encoder 67 to measure the speed of the motor shaft and provide feedback to the control circuitry, and control circuity 68 for receiving control signals and actuating the drive unit. Each drive unit 63 being independent controlled and motorized, the instrument driver 62 may provide multiple (four as shown in FIG. 15) independent drive outputs to the medical instrument. In operation, the control circuitry 68 would receive a control signal, transmit a motor signal to the motor 66, compare the resulting motor speed as measured by the encoder 67 with the desired speed, and modulate the motor signal to generate the desired torque.

For procedures that require a sterile environment, the robotic system may incorporate a drive interface, such as a sterile adapter connected to a sterile drape, that sits between the instrument driver and the medical instrument. The chief purpose of the sterile adapter is to transfer angular motion from the drive shafts of the instrument driver to the drive inputs of the instrument while maintaining physical separation, and thus sterility, between the drive shafts and drive inputs. Accordingly, an example sterile adapter may comprise of a series of rotational inputs and outputs intended to be mated with the drive shafts of the instrument driver and drive inputs on the instrument. Connected to the sterile adapter, the sterile drape, comprised of a thin, flexible material such as transparent or translucent plastic, is designed to cover the capital equipment, such as the instrument driver, robotic arm, and cart (in a cart-based system) or table (in a table-based system). Use of the drape would allow the capital equipment to be positioned proximate to the patient while still being located in an area not requiring sterilization (i.e., non-sterile field). On the other side of the sterile drape, the medical instrument may interface with the patient in an area requiring sterilization (i.e., sterile field).

D. Medical Instrument

Figure 16:
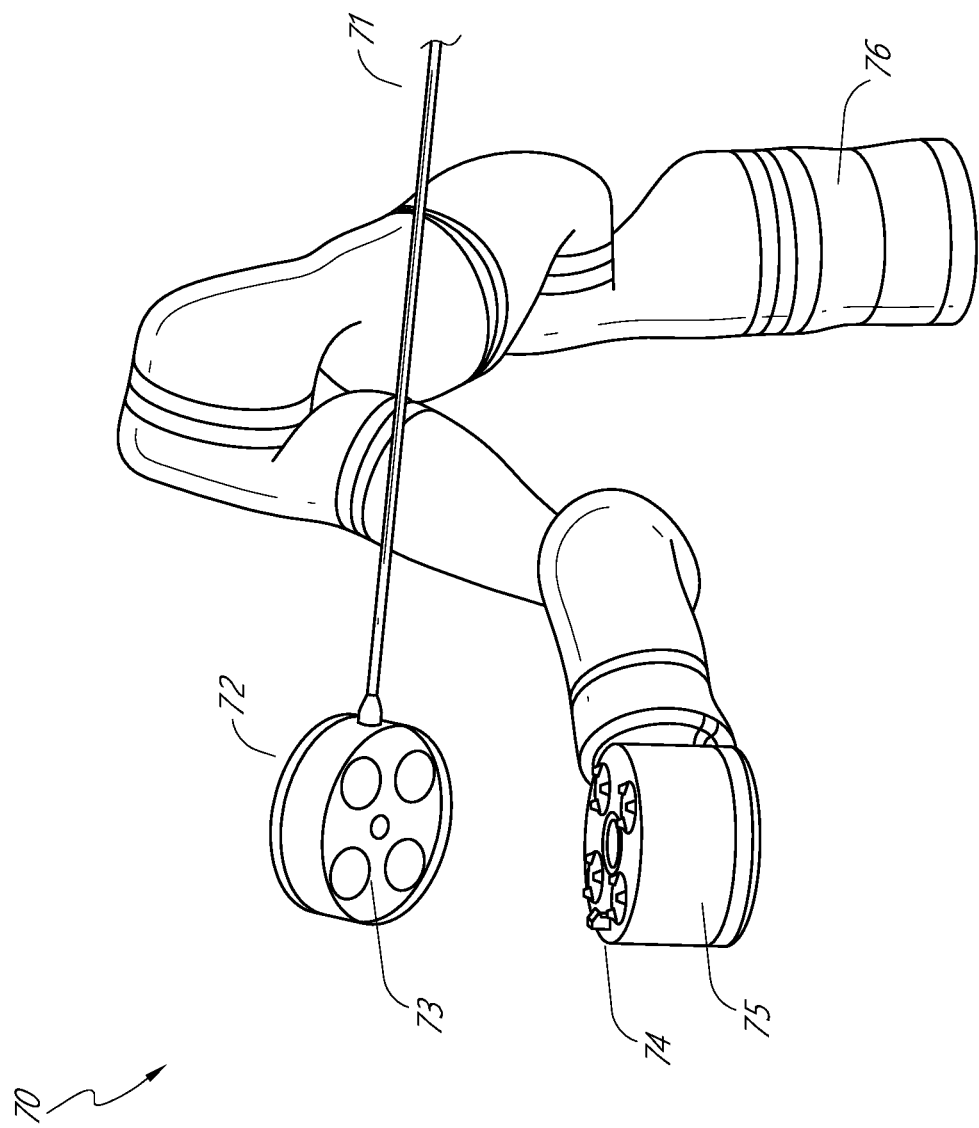
FIG. 16 illustrates an exemplary medical instrument with a paired instrument driver.

FIG. 16 illustrates an example medical instrument with a paired instrument driver. Like other instruments designed for use with a robotic system, medical instrument 70 comprises an elongated shaft 71 (or elongate body) and an instrument base 72. The instrument base 72, also referred to as an "instrument handle" due to its intended design for manual interaction by the physician, may generally comprise rotatable drive inputs 73, e.g., receptacles, pulleys or spools, that are designed to be mated with drive outputs 74 that extend through a drive interface on instrument driver 75 at the distal end of robotic arm 76. When physically connected, latched, and/or coupled, the mated drive inputs 73 of instrument base 72 may share axes of rotation with the drive outputs 74 in the instrument driver 75 to allow the transfer of torque from drive outputs 74 to drive inputs 73. In some embodiments, the drive outputs 74 may comprise splines that are designed to mate with receptacles on the drive inputs 73.

The elongated shaft 71 is designed to be delivered through either an anatomical opening or lumen, e.g., as in endoscopy, or a minimally invasive incision, e.g., as in laparoscopy. The elongated shaft 71 may be either flexible (e.g., having properties similar to an endoscope) or rigid (e.g., having properties similar to a laparoscope) or contain a customized combination of both flexible and rigid portions. When designed for laparoscopy, the distal end of a rigid elongated shaft may be connected to an end effector extending from a jointed wrist formed from a clevis with at least one degree of freedom and a surgical tool or medical instrument, such as, for example, a grasper or scissors, that may be actuated based on force from the tendons as the drive inputs rotate in response to torque received from the drive outputs 74 of the instrument driver 75. When designed for endoscopy, the distal end of a flexible elongated shaft may include a steerable or controllable bending section that may be articulated and bent based on torque received from the drive outputs 74 of the instrument driver 75.

Torque from the instrument driver 75 is transmitted down the elongated shaft 71 using tendons along the shaft 71. These individual tendons, such as pull wires, may be individually anchored to individual drive inputs 73 within the instrument handle 72. From the handle 72, the tendons are directed down one or more pull lumens along the elongated shaft 71 and anchored at the distal portion of the elongated shaft 71, or in the wrist at the distal portion of the elongated shaft. During a surgical procedure, such as a laparoscopic, endoscopic or hybrid procedure, these tendons may be coupled to a distally mounted end effector, such as a wrist, grasper, or scissor. Under such an arrangement, torque exerted on drive inputs 73 would transfer tension to the tendon, thereby causing the end effector to actuate in some way. In some embodiments, during a surgical procedure, the tendon may cause a joint to rotate about an axis, thereby causing the end effector to move in one direction or another. Alternatively, the tendon may be connected to one or more jaws of a grasper at distal end of the elongated shaft 71, where tension from the tendon cause the grasper to close.

In endoscopy, the tendons may be coupled to a bending or articulating section positioned along the elongated shaft 71 (e.g., at the distal end) via adhesive, control ring, or other mechanical fixation. When fixedly attached to the distal end of a bending section, torque exerted on drive inputs 73 would be transmitted down the tendons, causing the softer, bending section (sometimes referred to as the articulable section or region) to bend or articulate. Along the non-bending sections, it may be advantageous to spiral or helix the individual pull lumens that direct the individual tendons along (or inside) the walls of the endoscope shaft to balance the radial forces that result from tension in the pull wires. The angle of the spiraling and/or spacing there between may be altered or engineered for specific purposes, wherein tighter spiraling exhibits lesser shaft compression under load forces, while lower amounts of spiraling results in greater shaft compression under load forces, but also exhibits limits bending. On the other end of the spectrum, the pull lumens may be directed parallel to the longitudinal axis of the elongated shaft 71 to allow for controlled articulation in the desired bending or articulable sections.

In endoscopy, the elongated shaft 71 houses a number of components to assist with the robotic procedure. The shaft may comprise of a working channel for deploying surgical tools (or medical instruments), irrigation, and/or aspiration to the operative region at the distal end of the shaft 71. The shaft 71 may also accommodate wires and/or optical fibers to transfer signals to/from an optical assembly at the distal tip, which may include of an optical camera. The shaft 71 may also accommodate optical fibers to carry light from proximally-located light sources, such as light emitting diodes, to the distal end of the shaft.

At the distal end of the instrument 70, the distal tip may also comprise the opening of a working channel for delivering tools for diagnostic and/or therapy, irrigation, and aspiration to an operative site. The distal tip may also include a port for a camera, such as a fiberscope or a digital camera, to capture images of an internal anatomical space. Relatedly, the distal tip may also include ports for light sources for illuminating the anatomical space when using the camera.

In the example of FIG. 16, the drive shaft axes, and thus the drive input axes, are orthogonal to the axis of the elongated shaft. This arrangement, however, complicates roll capabilities for the elongated shaft 71. Rolling the elongated shaft 71 along its axis while keeping the drive inputs 73 static results in undesirable tangling of the tendons as they extend off the drive inputs 73 and enter pull lumens within the elongated shaft 71. The resulting entanglement of such tendons may disrupt any control algorithms intended to predict movement of the flexible elongated shaft during an endoscopic procedure.

Figure 17:
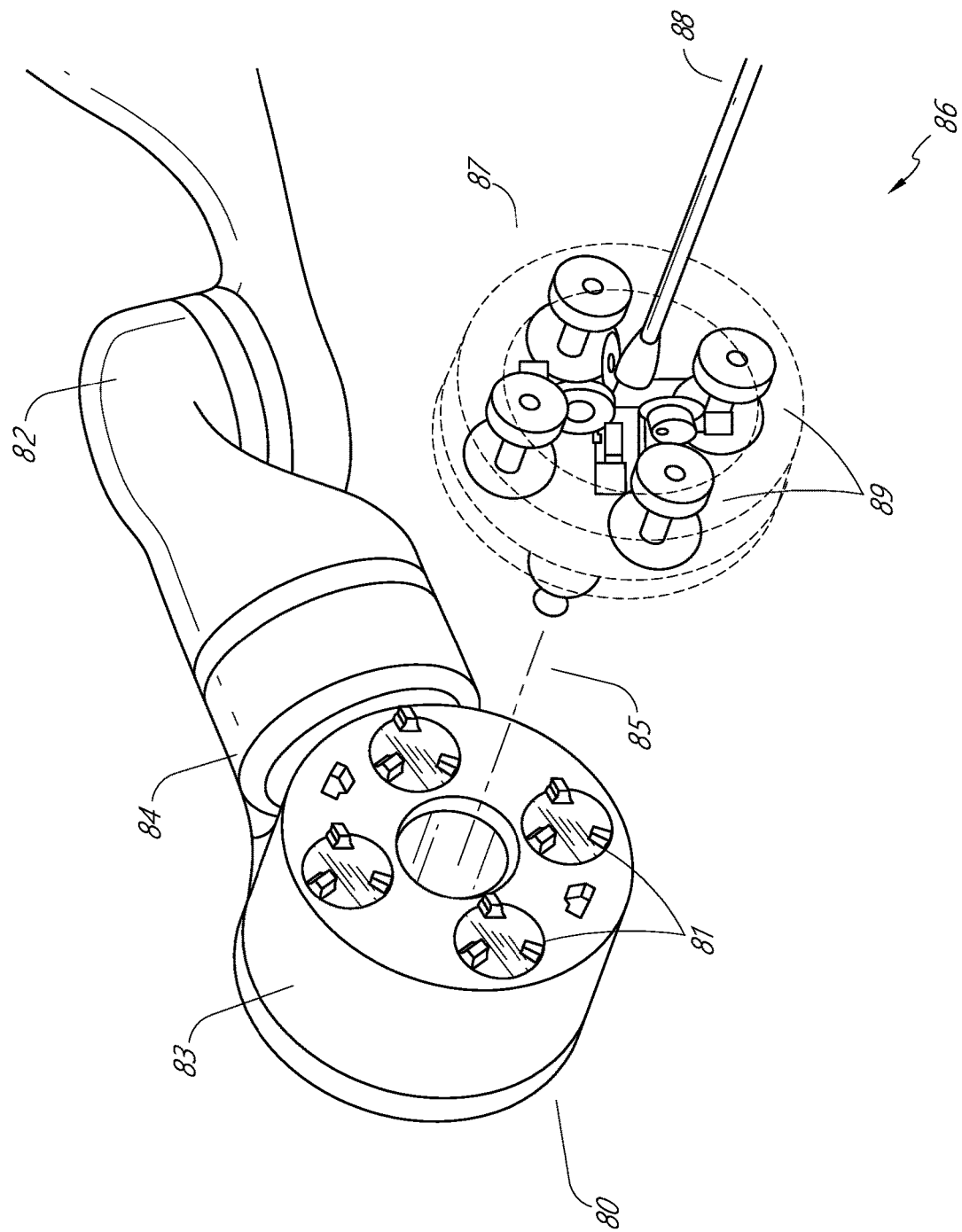
FIG. 17 illustrates an alternative design for an instrument driver and instrument where the axes of the drive units are parallel to the axis of the elongated shaft of the instrument.

FIG. 17 illustrates an alternative design for an instrument driver and instrument where the axes of the drive units are parallel to the axis of the elongated shaft of the instrument. As shown, a circular instrument driver 80 comprises four drive units with their drive outputs 81 aligned in parallel at the end of a robotic arm 82. The drive units, and their respective drive outputs 81, are housed in a rotational assembly 83 of the instrument driver 80 that is driven by one of the drive units within the assembly 83. In response to torque provided by the rotational drive unit, the rotational assembly 83 rotates along a circular bearing that connects the rotational assembly 83 to the non-rotational portion 84 of the instrument driver. Power and controls signals may be communicated from the non-rotational portion 84 of the instrument driver 80 to the rotational assembly 83 through electrical contacts may be maintained through rotation by a brushed slip ring connection (not shown). In other embodiments, the rotational assembly 83 may be responsive to a separate drive unit that is integrated into the non-rotatable portion 84, and thus not in parallel to the other drive units. The rotational mechanism 83 allows the instrument driver 80 to rotate the drive units, and their respective drive outputs 81, as a single unit around an instrument driver axis 85.

Like earlier disclosed embodiments, an instrument 86 may comprise an elongated shaft portion 88 and an instrument base 87 (shown with a transparent external skin for discussion purposes) comprising a plurality of drive inputs 89 (such as receptacles, pulleys, and spools) that are configured to receive the drive outputs 81 in the instrument driver 80. Unlike prior disclosed embodiments, instrument shaft 88 extends from the center of instrument base 87 with an axis substantially parallel to the axes of the drive inputs 89, rather than orthogonal as in the design of FIG. 16.

When coupled to the rotational assembly 83 of the instrument driver 80, the medical instrument 86, comprising instrument base 87 and instrument shaft 88, rotates in combination with the rotational assembly 83 about the instrument driver axis 85. Since the instrument shaft 88 is positioned at the center of instrument base 87, the instrument shaft 88 is coaxial with instrument driver axis 85 when attached. Thus, rotation of the rotational assembly 83 causes the instrument shaft 88 to rotate about its own longitudinal axis. Moreover, as the instrument base 87 rotates with the instrument shaft 88, any tendons connected to the drive inputs 89 in the instrument base 87 are not tangled during rotation. Accordingly, the parallelism of the axes of the drive outputs 81, drive inputs 89, and instrument shaft 88 allows for the shaft rotation without tangling any control tendons.

Figure 18:
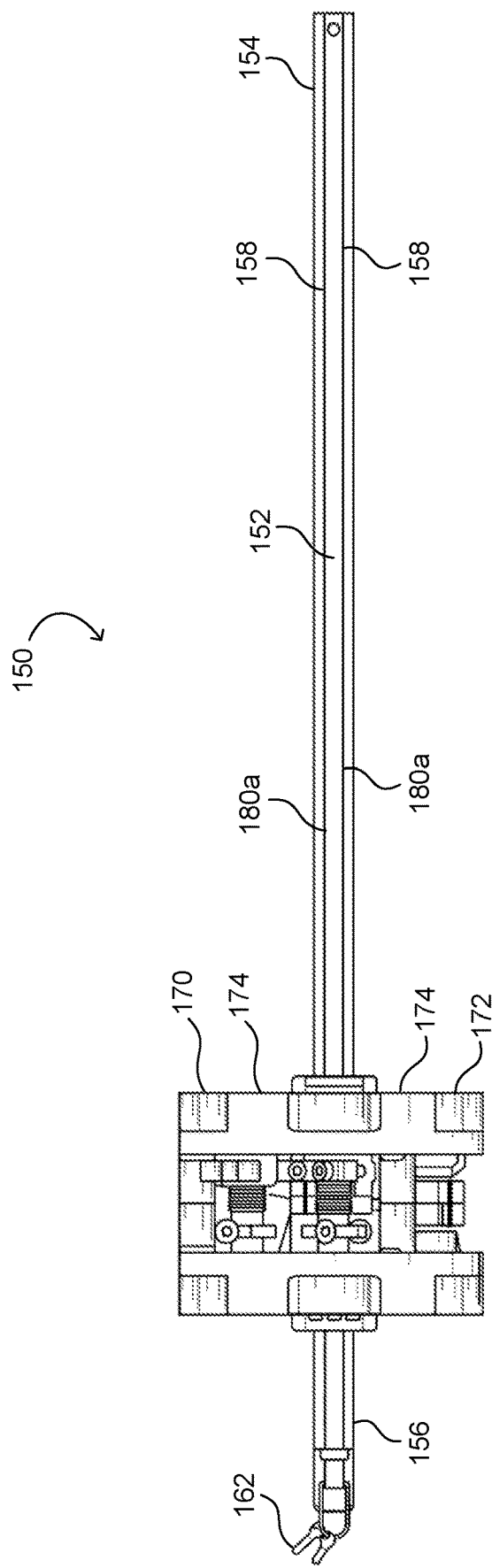
FIG. 18 illustrates an instrument having an instrument-based insertion architecture.

FIG. 18 illustrates an instrument having an instrument based insertion architecture in accordance with some embodiments. The instrument 150 can be coupled to any of the instrument drivers discussed above. The instrument 150 comprises an elongated shaft 152, an end effector 162 connected to the shaft 152, and a handle 170 coupled to the shaft 152. The elongated shaft 152 comprises a tubular member having a proximal portion 154 and a distal portion 156. The elongated shaft 152 comprises one or more channels or grooves 158 along its outer surface. The grooves 158 are configured to receive one or more wires or cables 180 therethrough. One or more cables 180 thus run along an outer surface of the elongated shaft 152. In other embodiments, cables 180 can also run through the elongated shaft 152. Manipulation of the one or more cables 180 (e.g., via an instrument driver) results in actuation of the end effector 162.

The instrument handle 170, which may also be referred to as an instrument base, may generally comprise an attachment interface 172 having one or more mechanical inputs 174, e.g., receptacles, pulleys or spools, that are designed to be reciprocally mated with one or more torque couplers on an attachment surface of an instrument driver.

In some embodiments, the instrument 150 comprises a series of pulleys or cables that enable the elongated shaft 152 to translate relative to the handle 170. In other words, the instrument 150 itself comprises an instrument-based insertion architecture that accommodates insertion of the instrument, thereby minimizing the reliance on a robot arm to provide insertion of the instrument 150. In other embodiments, a robotic arm can be largely responsible for instrument insertion.

E. Controller

Any of the robotic systems described herein can include an input device or controller for manipulating an instrument attached to a robotic arm. In some embodiments, the controller can be coupled (e.g., communicatively, electronically, electrically, wirelessly and/or mechanically) with an instrument such that manipulation of the controller causes a corresponding manipulation of the instrument e.g., via master slave control.

Figure 19:
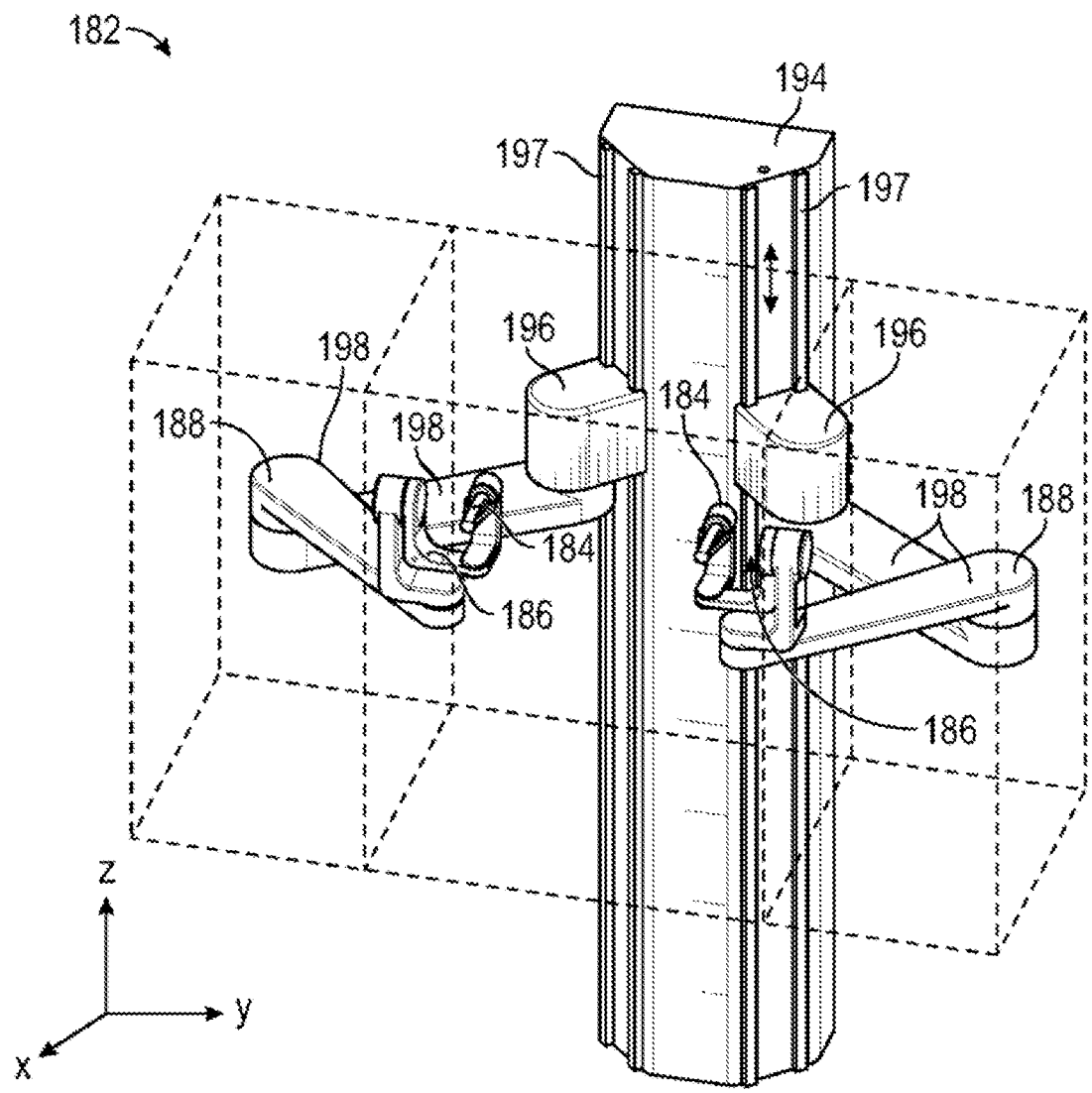
FIG. 19 illustrates an exemplary controller.

FIG. 19 is a perspective view of an embodiment of a controller 182. In the present embodiment, the controller 182 comprises a hybrid controller that can have both impedance and admittance control. In other embodiments, the controller 182 can utilize just impedance or passive control. In other embodiments, the controller 182 can utilize just admittance control. By being a hybrid controller, the controller 182 advantageously can have a lower perceived inertia while in use.

In the illustrated embodiment, the controller 182 is configured to allow manipulation of two medical instruments, and includes two handles 184. Each of the handles 184 is connected to a gimbal 186. Each gimbal 186 is connected to a positioning platform 188.

As shown in FIG. 19, each positioning platform 188 includes a SCARA arm (selective compliance assembly robot arm) 198 coupled to a column 194 by a prismatic joint 196. The prismatic joints 196 are configured to translate along the column 194 (e.g., along rails 197) to allow each of the handles 184 to be translated in the z-direction, providing a first degree of freedom. The SCARA arm 198 is configured to allow motion of the handle 184 in an x-y plane, providing two additional degrees of freedom.

In some embodiments, one or more load cells are positioned in the controller. For example, in some embodiments, a load cell (not shown) is positioned in the body of each of the gimbals 186. By providing a load cell, portions of the controller 182 are capable of operating under admittance control, thereby advantageously reducing the perceived inertia of the controller while in use. In some embodiments, the positioning platform 188 is configured for admittance control, while the gimbal 186 is configured for impedance control. In other embodiments, the gimbal 186 is configured for admittance control, while the positioning platform 188 is configured for impedance control. Accordingly, for some embodiments, the translational or positional degrees of freedom of the positioning platform 188 can rely on admittance control, while the rotational degrees of freedom of the gimbal 186 rely on impedance control.

F. Navigation and Control

Traditional endoscopy may involve the use of fluoroscopy (e.g., as may be delivered through a C-arm) and other forms of radiation-based imaging modalities to provide endoluminal guidance to an operator physician. In contrast, the robotic systems contemplated by this disclosure can provide for non-radiation-based navigational and localization means to reduce physician exposure to radiation and reduce the amount of equipment within the operating room. As used herein, the term "localization" may refer to determining and/or monitoring the position of objects in a reference coordinate system. Technologies such as pre-operative mapping, computer vision, real-time EM tracking, and robot command data may be used individually or in combination to achieve a radiation-free operating environment. In other cases, where radiation-based imaging modalities are still used, the pre-operative mapping, computer vision, real-time EM tracking, and robot command data may be used individually or in combination to improve upon the information obtained solely through radiation-based imaging modalities.

Figure 20:
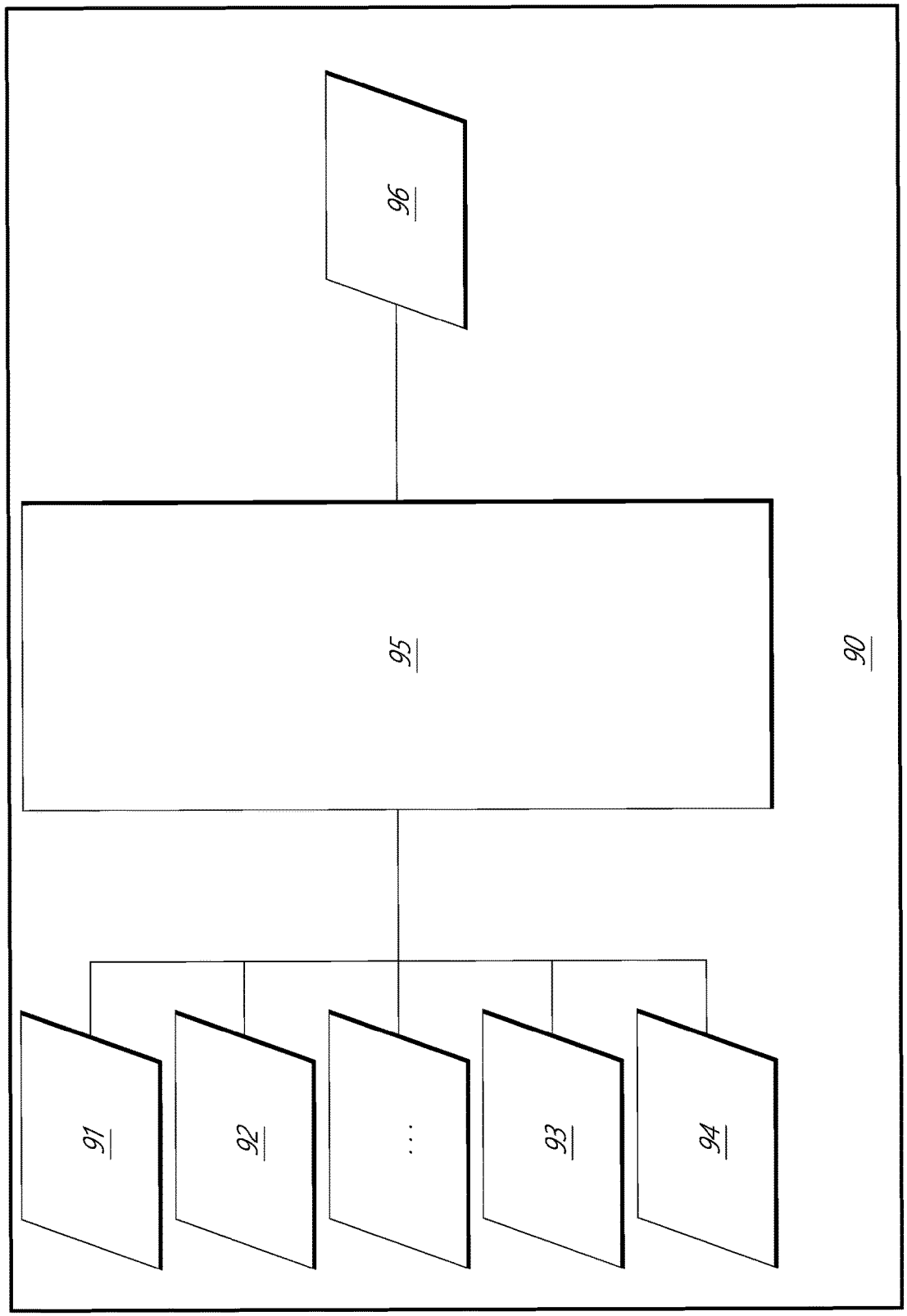
FIG. 20 depicts a block diagram illustrating a localization system that estimates a location of one or more elements of the robotic systems of FIGS. 1-10, such as the location of the instrument of FIGS. 16-18, in accordance to an example embodiment.

FIG. 20 is a block diagram illustrating a localization system 90 that estimates a location of one or more elements of the robotic system, such as the location of the instrument, in accordance to an example embodiment. The localization system 90 may be a set of one or more computer devices configured to execute one or more instructions. The computer devices may be embodied by a processor (or processors) and computer-readable memory in one or more components discussed above. By way of example and not limitation, the computer devices may be in the tower 30 shown in FIG. 1, the cart shown in FIGS. 1-4, the beds shown in FIGS. 5-14, etc.

As shown in FIG. 20, the localization system 90 may include a localization module 95 that processes input data 91-94 to generate location data 96 for the distal tip of a medical instrument. The location data 96 may be data or logic that represents a location and/or orientation of the distal end of the instrument relative to a frame of reference. The frame of reference can be a frame of reference relative to the anatomy of the patient or to a known object, such as an EM field generator (see discussion below for the EM field generator).

The various input data 91-94 are now described in greater detail. Pre-operative mapping may be accomplished through the use of the collection of low dose CT scans. Pre-operative CT scans are reconstructed into three-dimensional images, which are visualized, e.g. as "slices" of a cutaway view of the patient's internal anatomy. When analyzed in the aggregate, image-based models for anatomical cavities, spaces and structures of the patient's anatomy, such as a patient lung network, may be generated. Techniques such as centerline geometry may be determined and approximated from the CT images to develop a three-dimensional volume of the patient's anatomy, referred to as model data 91 (also referred to as "preoperative model data" when generated using only preoperative CT scans). The use of center-line geometry is discussed in U.S. patent application Ser. No. 14/523,760, issued as U.S. Pat. No. 9,763,741 on Sep. 19, 2017, the contents of which are herein incorporated in its entirety. Network topological models may also be derived from the CT-images, and are particularly appropriate for bronchoscopy.

In some embodiments, the instrument may be equipped with a camera to provide vision data 92. The localization module 95 may process the vision data to enable one or more vision-based location tracking. For example, the preoperative model data may be used in conjunction with the vision data 92 to enable computer vision-based tracking of the medical instrument (e.g., an endoscope or an instrument advance through a working channel of the endoscope). For example, using the preoperative model data 91, the robotic system may generate a library of expected endoscopic images from the model based on the expected path of travel of the endoscope, each image linked to a location within the model. Intra-operatively, this library may be referenced by the robotic system in order to compare real-time images captured at the camera (e.g., a camera at a distal end of the endoscope) to those in the image library to assist localization.

Other computer vision-based tracking techniques use feature tracking to determine motion of the camera, and thus the endoscope. Some features of the localization module 95 may identify circular geometries in the preoperative model data 91 that correspond to anatomical lumens and track the change of those geometries to determine which anatomical lumen was selected, as well as the relative rotational and/or translational motion of the camera. Use of a topological map may further enhance vision-based algorithms or techniques.

Optical flow, another computer vision-based technique, may analyze the displacement and translation of image pixels in a video sequence in the vision data 92 to infer camera movement. Examples of optical flow techniques may include motion detection, object segmentation calculations, luminance, motion compensated encoding, stereo disparity measurement, etc. Through the comparison of multiple frames over multiple iterations, movement and location of the camera (and thus the endoscope) may be determined.

The localization module 95 may use real-time EM tracking to generate a real-time location of the endoscope in a global coordinate system that may be registered to the patient's anatomy, represented by the preoperative model. In EM tracking, an EM sensor (or tracker) comprising of one or more sensor coils embedded in one or more locations and orientations in a medical instrument (e.g., an endoscopic tool) measures the variation in the EM field created by one or more static EM field generators positioned at a known location. The location information detected by the EM sensors is stored as EM data 93. The EM field generator (or transmitter), may be placed close to the patient to create a low intensity magnetic field that the embedded sensor may detect. The magnetic field induces small currents in the sensor coils of the EM sensor, which may be analyzed to determine the distance and angle between the EM sensor and the EM field generator. These distances and orientations may be intra-operatively "registered" to the patient anatomy (e.g., the preoperative model) in order to determine the geometric transformation that aligns a single location in the coordinate system with a position in the pre-operative model of the patient's anatomy. Once registered, an embedded EM tracker in one or more positions of the medical instrument (e.g., the distal tip of an endoscope) may provide real-time indications of the progression of the medical instrument through the patient's anatomy.

Robotic command kinematics data 94 may also be used by the localization module 95 to provide localization data 96 for the robotic system. Device pitch and yaw resulting from articulation commands may be determined during pre-operative calibration. Intra-operatively, these calibration measurements may be used in combination with known insertion depth information to estimate the position of the instrument. Alternatively, these calculations may be analyzed in combination with EM, vision, and/or topological modeling to estimate the position of the medical instrument within the network.

As FIG. 20 shows, a number of other input data can be used by the localization module 95. For example, although not shown in FIG. 20, an instrument utilizing shape-sensing fiber can provide shape data that the localization module 95 can use to determine the location and shape of the instrument.

The localization module 95 may use the input data 91-94 in combination(s). In some cases, such a combination may use a probabilistic approach where the localization module 95 assigns a confidence weight to the location determined from each of the input data 91-94. Thus, where the EM data may not be reliable (as may be the case where there is EM interference) the confidence of the location determined by the EM data 93 can be decrease and the localization module 95 may rely more heavily on the vision data 92 and/or the robotic command kinematics data 94.

As discussed above, the robotic systems discussed herein may be designed to incorporate a combination of one or more of the technologies above. The robotic system's computer-based control system, based in the tower, bed and/or cart, may store computer program instructions, for example, within a non-transitory computer-readable storage medium such as a persistent magnetic storage drive, solid state drive, or the like, that, upon execution, cause the system to receive and analyze sensor data and user commands, generate control signals throughout the system, and display the navigational and localization data, such as the position of the instrument within the global coordinate system, anatomical map, etc.

2. Robotic Systems with Rapid Communication of Emergency Signals

As shown in several of the examples described above, robotic systems can include multiple nodes (e.g., joints or motor drivers associated with respective joints) configured to control the movement of several links. For important operations (e.g., surgical operations for medical robotic systems), it is may be beneficial to communicate certain signals (e.g., emergency signals) rapidly through the multiple nodes. For example, it may be beneficial to communicate emergency stop signals to the multiple nodes rapidly so that all of the nodes can stop further movements to, for example, avoid any collision. However, addition of dedicated communication lines for emergency signals can be challenging at least for reasons explained below.

This application discloses robotic systems that utilize differential communication lines for communicating emergency signals as non-differential signals to improve the speed and reliability of communicating emergency signals without requiring separate, dedicated communication lines.

A. Example Medical Robotic System

Figure 21:
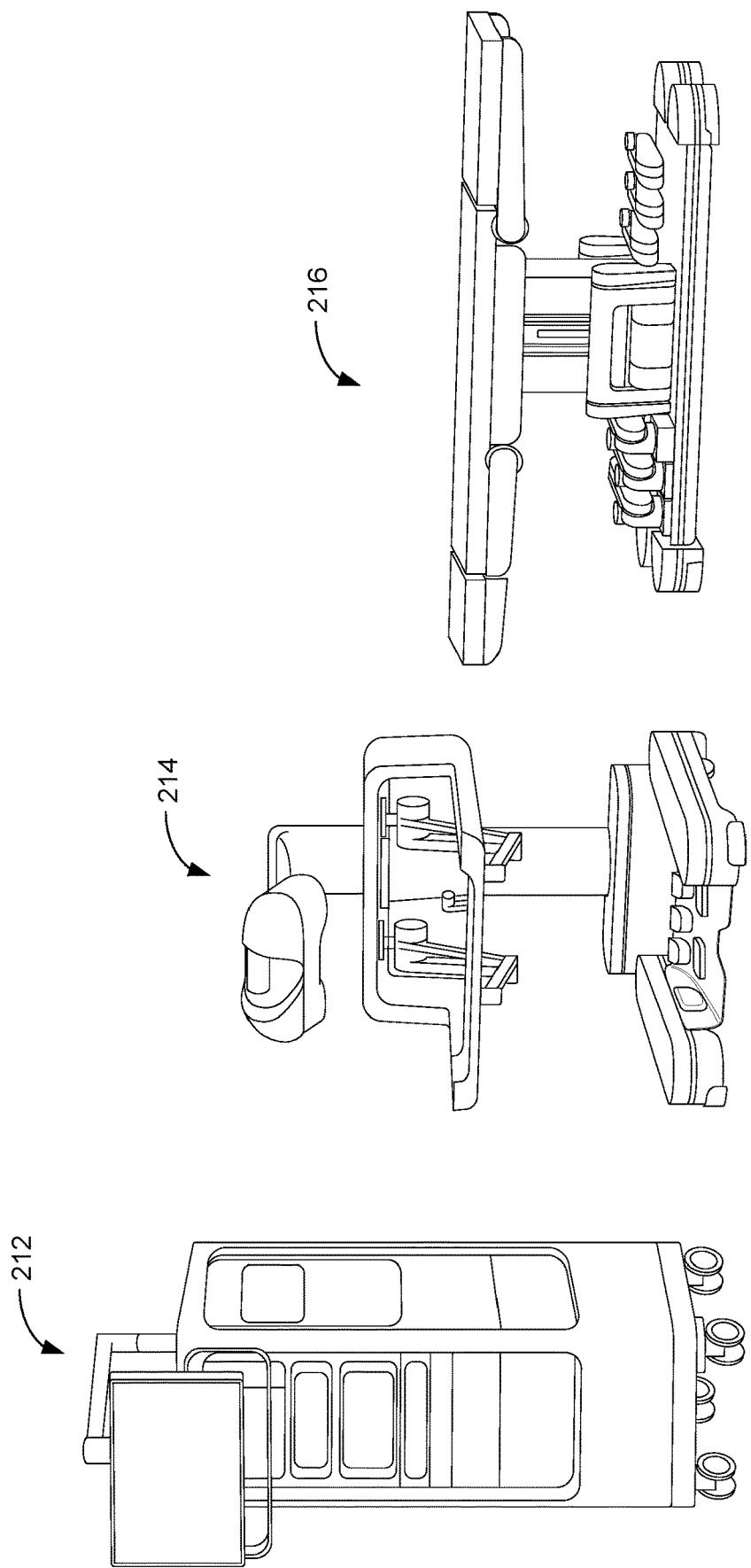
FIG. 21 illustrates components of a medical robotic system in accordance with some embodiments.

In some embodiments, the robotic system is a medical robotic system with multiple components, such as a tower 212, a physician console 214, and a surgical table 216 shown in FIG. 21. The surgical table 216 may correspond to the system 36 or the table-based surgical robotics system 100 described above, and may have robotic arms with surgical tools. The tower 212 may correspond to the tower 30 described above, and may provide support for controls, electronics, fluidics, optics, sensors, and/or power for the surgical table 216 and the physician console 214. The physician console 214 may include a user interface used by the physician operator for operating the surgical table 216. The physician console 214 may provide both robotic controls and pre-operative and real-time information of a medical procedure to a physician operator.

Figure 22:
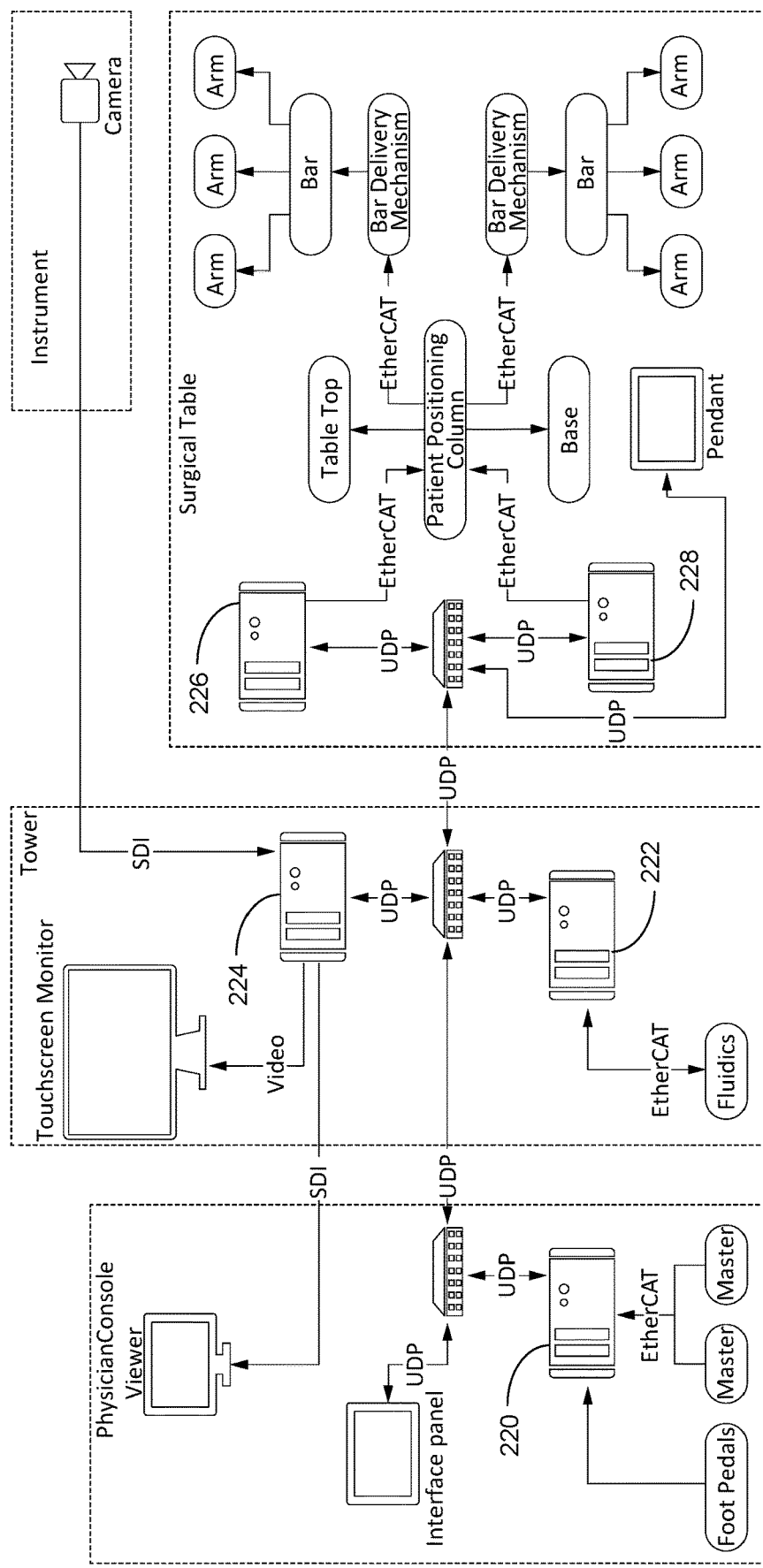
FIG. 22 illustrates an architecture of the medical robotic system in accordance with some embodiments.

An example architecture of the medical robotic system, in accordance with some embodiments, is shown in FIG. 22. The medical robotic system may include multiple software processes running on different computers (e.g., five computer shown in FIG. 22). In some embodiments, the processes running on a physician console computer 220 are responsible for all the hardware control and low-level safeties of the masters in the physician console. In some embodiments, the processes running on a tower computer 222 are responsible for all the hardware control and low-level safeties of the tower peripherals, including any fluidics system.

In some embodiments, the processes running on the tower computer 224 are responsible for the touch screen user interface on the tower. This user interface provides different views and workflows for system setup, intra-procedure use, and system tear-down. In some embodiments, the processes running on the surgical table computers 226 and 228 are responsible for all the hardware control and low-level safeties of the patient-side robotic system, including the robot arms, advanced device manipulators (ADMs), and surgical table.

As shown in FIG. 22, the patient platform utilizes an electrical communication protocol (e.g., Ethercat) to communicate signals throughout the system. For example, the Ethercat protocol enables fast and reliable real-time control of the robotic arms. In some embodiments, the computer 224 can send data via wires or conductors through individual nodes with such electrical communication protocol. In some embodiments, each node is representative of a motor driver (e.g., in the set-up joints, robotic arms, bar, or bed).

Figure 23:
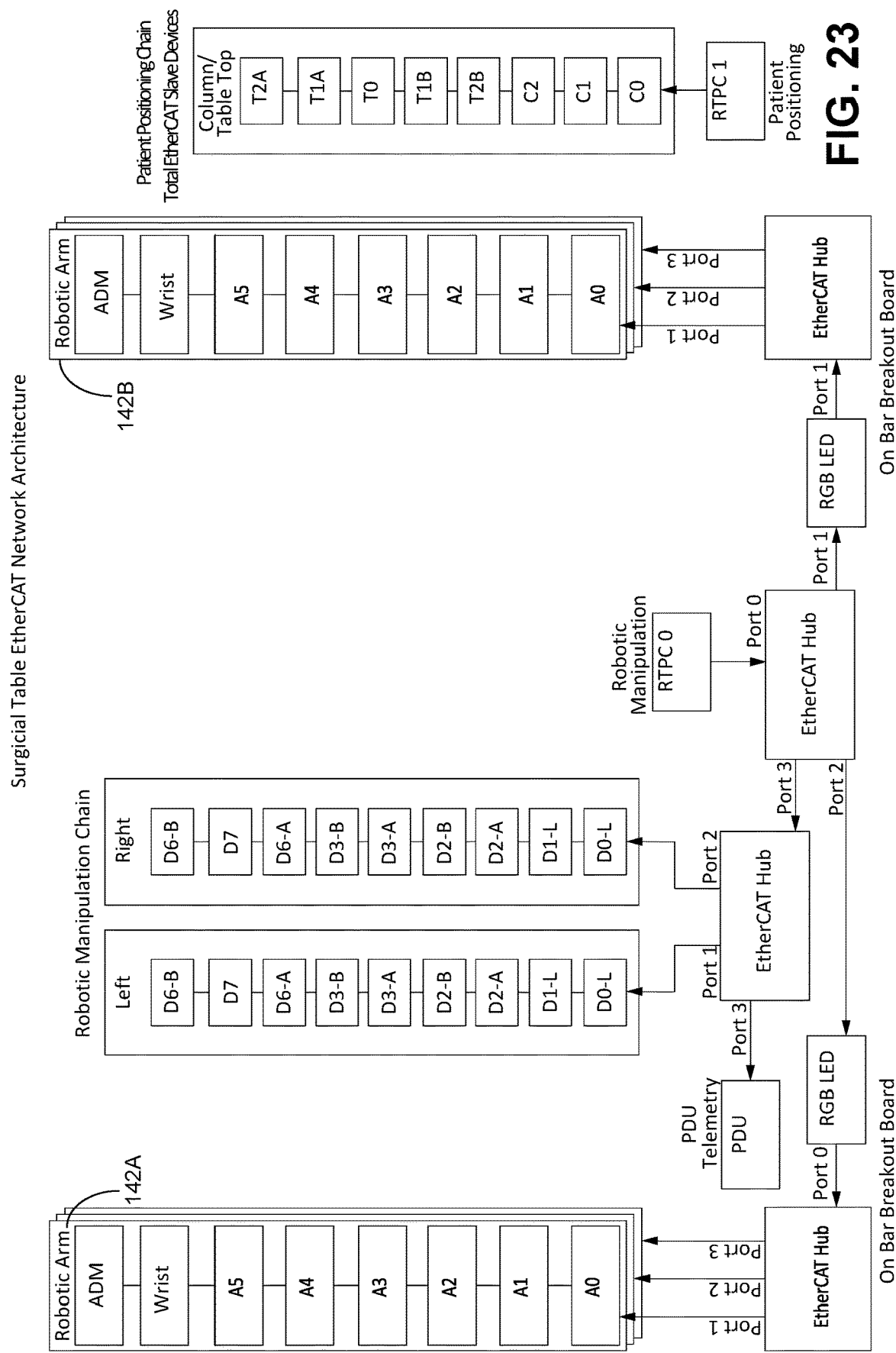
FIG. 23 illustrates a network architecture of the medical robotic system in accordance with some embodiments.
Figure 24:
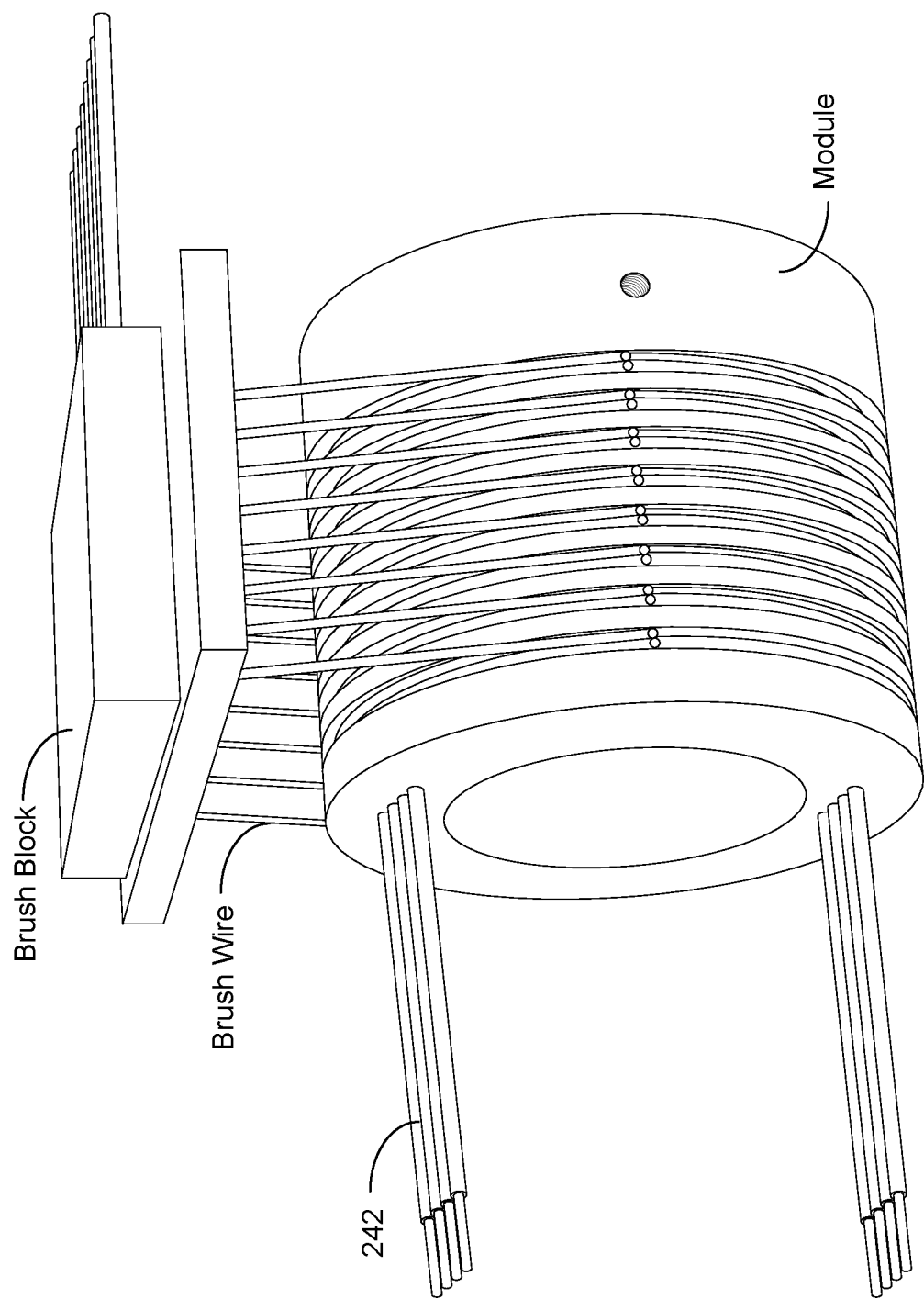
FIG. 24 illustrates a slip ring structure in accordance with some embodiments.

A network architecture of the medical robotic system, in accordance with some embodiments, is shown in FIG. 23. In some embodiments, the medical robotic system has a different number (e.g., more or fewer) of components than as shown in FIG. 23. In some embodiments, the medical robotic system has additional components not shown in FIG. 23. In FIG. 23, the medical robotic system has a plurality of nodes (e.g., motor joints with motorized drivers), such as motor drivers A0 through A5 (and a write motor driver and an ADM) on robotic arm 142A and motor drivers A0 through A5 (and a write motor driver and an ADM) on robotic arm 142B. The large number of nodes (e.g., motor drivers) may require a large number of conductive lines to convey electrical signals to them. However, in some of the nodes, it can be a challenge providing numerous conductive lines due to space constraints. For example, in rotating joint nodes of a robotic arm, one or more slip rings may be provided to serve as electrical connections for rotating assemblies. As shown in FIG. 24, a number of conductive lines or "brushes" 242 can extend to a slip ring body, where they can then wrap about the slip ring body. These conductive lines and/or brushes serve as electrical contacts, and the number of conductive lines that can be wrapped around the slip ring body correlates to the diameter of the slip ring body itself. Due to the limited size of the slip ring body diameter, there is a limited number of conductive lines and/or brushes that can fit through the slip rings.

For example, in some robotic systems, communications are performed using four conductive wires (two pairs of conductive wires) for receiving (Rx) and transmitting (Tx) electrical signals, and it can be challenging to add additional wires for transmitting emergency signals (e.g., emergency stop signals) to a limited physical space (e.g., due to the size of the slip ring body diameter, etc.).

The present application utilizes existing conductive lines (e.g., Internet, Ethernet, or Ethercat lines) for data communication (e.g., transmission and receiving) to also provide emergency signals (e.g., emergency stop (E-STOP) signals). This advantageously allows existing conductive lines for transmitting and receiving data to also enable emergency signaling, thereby reducing the need for additional conductive lines and providing space conservation.

B. Differential Communication Interface

In some embodiments, a differential signal interface (e.g., Ethernet, Ethercat, RS422, or low-voltage differential signaling (LVDS)) is used for communicating both robotic command signals (e.g., motion commands) and transmitting emergency signals (e.g., emergency stop signals). Emergency stop signals can be provided when, for example, a fault is presented in one node (e.g., a software fault associated with a robotic arm) of the system, or when a button signaling an emergency stop is depressed. Such information can then be propagated to other nodes in the system to, for example, stop movements of other joints.

In some embodiments, the robotic system includes different conductive pairs (e.g., 2 differential pairs for Rx and Tx signals), and the common-mode voltage-level of the pairs is used to signal emergency signals. Traditionally, the floating nature of the common-mode voltage-level enables electrical isolation (e.g., the floated common-mode voltage does not require connecting systems to share a common ground). As a result, the common-mode voltage of the differential communication is typically allowed to float on two ends of communication. Instead of floating the common-mode voltage, setting the common mode voltage to various levels provides an additional communication channel in the differential communication interface, which may be used to communicate emergency signals independently from the robotic command signals.

Figure 25:
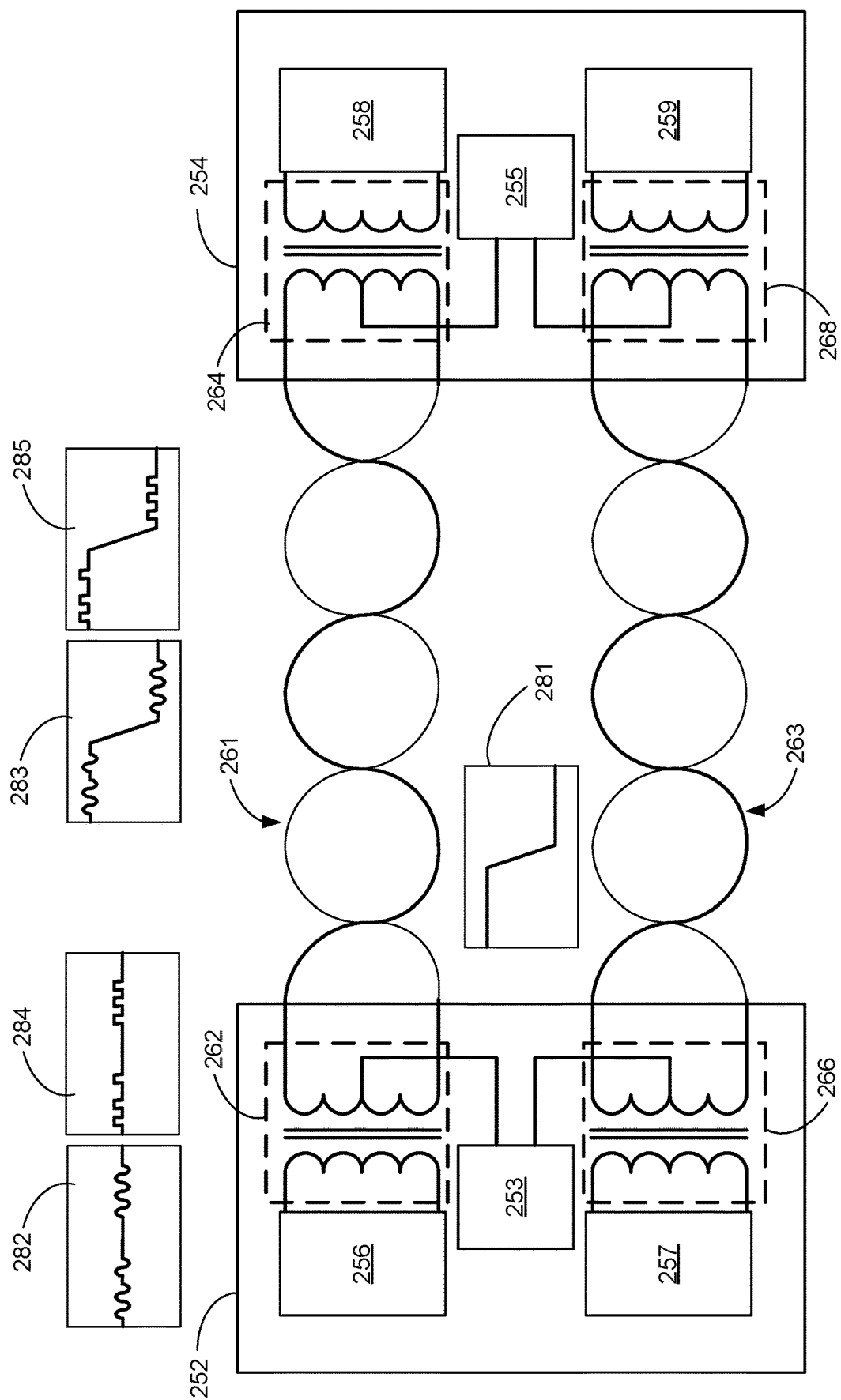
FIG. 25 is a schematic diagram illustrating nodes communicating signals over common mode voltage in accordance with some embodiments.

FIG. 25 is a schematic diagram illustrating nodes 252 and 254 communicating signals over common mode voltage in accordance with some embodiments. In FIG. 25, node 252 has a circuit 256 for transmitting signals and a circuit 257 for receiving signals, and similarly, node 254 has a circuit 258 for receiving signals and a circuit 259 for transmitting signals. For example, the signals transmitted by the circuit 256 in node 252 are received by the circuit 258 in node 254, and the signals transmitted by the circuit 259 in node 254 are received by the circuit 257 in node 252. In some embodiments, the signals transmitted or received by circuits 256, 257, 258, or 259 are encoded (e.g., using an encoding method, such as 8b/10b encoding, amplitude-shift keying, frequency-shift keying, phase-shift keying, binary frequency-shift keying, or multiple frequency-shift keying or any combination thereof) for communicating instructions for activating motor drives and/or information (e.g., sensor information, etc.) between the nodes.

In some embodiments, the signals transmitted or received by circuits 256, 257, 258, or 259 are transmitted over a respective pair of conductors (or conductive lines) as differential signals, whereas emergency signals are transmitted over the respective pair of conductors as common-mode voltage-level. A respective pair of conductors 261 or 263 may be a twisted-pair cable, such as 10BASE-T, 100BASE-T, 1000BASE-T, 10GBASE-T, 25GBASE-T, or 40GBASE-T, which may be used for transmitting differential signals pursuant to various communication protocols, such as Internet, Ethernet, or Ethercat communication protocols.

In FIG. 25, node 252 includes a circuit 253 for transmitting and/or receiving emergency signals and node 254 includes a circuit 255 for transmitting and/or receiving emergency signals. Inset 281 shows an example of a waveform of an electrical signal transmitted by circuit 253 and received by circuit 255. In some embodiments, node 252 includes circuit 262 for combining differential electrical signals from circuit 256 (shown in inset 282 or 284) and common-mode voltage signals from circuit 253 (shown in inset 281). The combined electrical signals, communicated through the pair of electrical conductors 261, may have the waveforms shown in inset 283 or 285. In some embodiments, circuit 262 also splits common-mode voltage signals from differential electrical signals. In some embodiments, node 254 includes circuit 264 for splitting differential electrical signals for circuit 258 and common-mode voltage signals for circuit 255 (so that circuit 258 receives electrical signals shown in inset 282 or 284 and circuit 255 receives electrical signals shown in inset 281). In some embodiments, circuit 264 also combines common mode voltage signals from circuit 255 with the differential electrical signals transmitted over the conductors 261. Similarly, in some embodiments, node 254 includes circuit 268 for combining differential electrical signals from circuit 259 and common-mode voltage signals from circuit 255, and node 252 includes circuit 266 for splitting differential electrical signals for circuit 258 and common-mode voltage signals for circuit 255.

Although circuits 262, 264, 266, and 268 shown in in FIG. 25 include inductors for combining and/or separating differential electrical signals from common-mode voltage signals (and using a center tap of the inductor for receiving common-mode voltage signals), circuits 262, 264, 266, and 268 may provide or retrieve common-mode voltage signals without inductors. For example, in some embodiments, any of circuits 262, 264, 266, and 268 may include a summing amplifier for retrieving the common-mode voltage signals and a differential amplifier for retrieving the differential signals. In some configurations, summing amplifiers and differential amplifiers are implemented using operational amplifiers. In addition, in some embodiments, any of circuits 262, 264, 266, and 268 may include a pull-up resistor and/or a pull-down resistor for combining the common-mode voltage signals with the differential electrical signals.

C. Unidirectional Emergency Signaling Using Common-Mode Voltage-Level

As explained above, the common-mode voltage may be used for communicating emergency signals, while differential signals are used for communicating robotic commands or other information. In some embodiments, the robotic system includes a circuit configured to operate with a single threshold voltage level for communicating emergency signals. For example, a respective node may include a circuit that is configured to set the common-mode voltage to a high voltage (e.g., 24 V) to signal normal conditions or to a low voltage (e.g., 4 V) to transmit an emergency signal or indicate a fault state.

Figure 26:
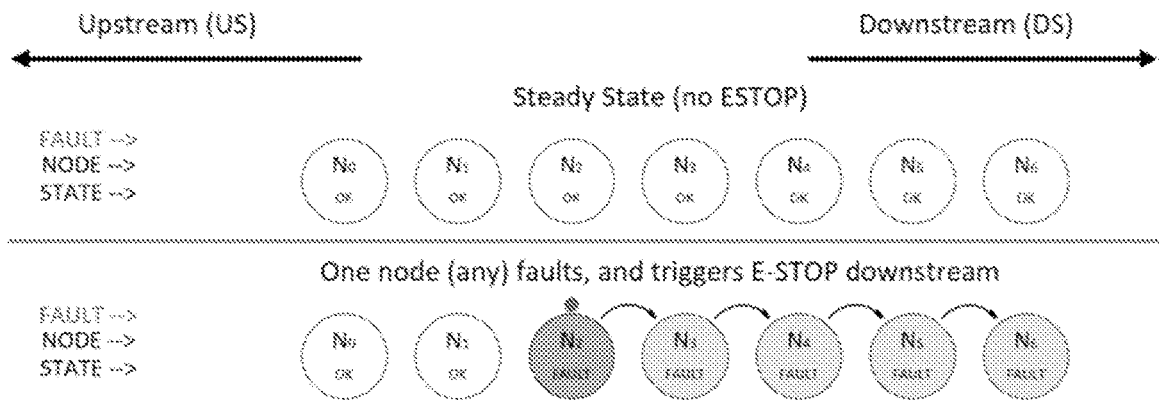
FIG. 26 is a schematic diagram illustrating an example of unidirectional communication of emergency signals.

In some embodiments, such circuits with a single voltage threshold are used for unidirectional communication of emergency signals. In some cases, the robotic system with such circuits is deemed to be "unidirectional" as the emergency signals are transmitted in one direction (e.g., upstream only or downstream only). FIG. 26 illustrates an example of unidirectional (e.g., downstream) communication of emergency signals in a robotic system with seven nodes (e.g., N0 through N6), which may correspond to one or more nodes shown in FIG. 23, such as motor drivers A0 through A5 and the wrist node, or D0 through D7 nodes, for example. While none of the nodes are in a fault state, no emergency signals are transmitted. However, after a circuit (or a processor) associated with one of the nodes, such as the N2 node, detects a fault, the circuit generates an emergency signal, which is propagated to the next downstream node (e.g., the N3 node). The downstream node, upon receiving the emergency signal, goes into a fault state and generates an emergency signal, which is also propagated to the next downstream node. By repeating these operations downstream, the downstream nodes (e.g., nodes N3 through N6) receive the emergency signal in sequence and go into the fault state in series. In some embodiments, the emergency signals are also sent to a master controller (e.g., computer 222, 224, 226, and/or 228 shown in FIG. 22), which may send the emergency signals to other nodes within the robotic system (e.g., nodes that are not in the same chain with the node N2; and/or nodes in the upstream of N2, such as N0 and N1) and put the motor drivers associated with such nodes into a fault state. For example, sending the emergency signals to all of the nodes in the robotic system will cause a system-wide halt.

Figure 27:
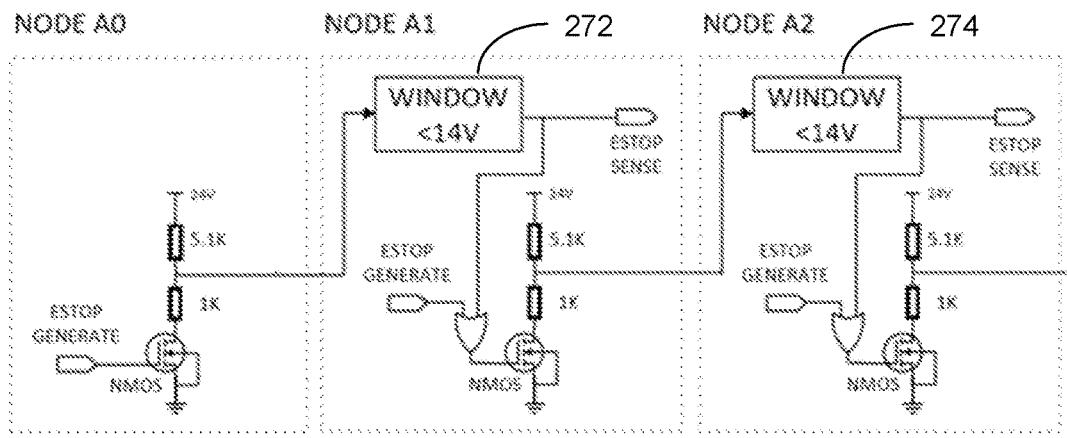
FIG. 27 is a schematic diagram illustrating circuits for unidirectional communication of emergency signals in accordance with some embodiments.

An example circuit that utilizes a single voltage threshold for unidirectional communication of emergency signals is shown in FIG. 27. While a particular node (e.g., node A0) is not in a fault state (e.g., the particular node is in a normal state), the node provides a high voltage (e.g., a voltage within a predefined high voltage range, such as 14-36 V) to signal normal conditions, and while the particular node is in the fault state, the node provides a low voltage (e.g., a voltage within a predefined low voltage range, such as 0-14 V) to signal a fault state or communicate an emergency signal. In FIG. 27, the particular node includes a pull-down circuit to provide a voltage that switches between the high voltage and the low voltage. For example, the high voltage may be 24 V and the low voltage may be 4 V, in which case the voltage threshold of 14 V may be used. In some embodiments, the high voltage corresponds to a voltage provided by a voltage source. In some embodiments, the low voltage is determined by resistance values of pull-up and pull-down resistors and the voltage provided by the voltage source.

The voltage provided by the particular node is communicated as a common-mode voltage of a pair of conductors using, for example, the circuits shown in FIG. 25. For brevity, such components are not shown in FIG. 27.

An adjacent node (e.g., node A1) compares the common-mode voltage to the voltage threshold (e.g., 14 V) to determine whether an emergency signal has been received (e.g., using a voltage monitor 272). As shown in FIG. 27, the logic signal from the voltage comparator indicating that the emergency signal has been received triggers the transistor (e.g., causing NMOS to conduct charges between the source and the drain) so that a high voltage is communicated to a subsequent node (e.g., as a common-mode voltage of a pair of conductors between nodes A1 and A2). These operations may be repeated so that the emergency signal can be propagated through subsequent nodes (e.g., downstream nodes).

D. Bidirectional Emergency Signaling Using Common-Mode Voltage-Level

In some cases, bidirectional communication of emergency signals (e.g., transmitting emergency signals to both upstream and downstream nodes) may be used. There are at least two types of bidirectional emergency signaling: simple bidirectional signaling and complex bidirectional signaling. For simple bidirectional emergency signaling, a circuit may operate with a single voltage threshold for a respective comparator. In complex bidirectional signaling, a circuit may operate with multiple voltage thresholds for a respective voltage comparator to distinguish an upstream emergency signal and a downstream emergency signal. The ability to distinguish between upstream and downstream emergency signals can enable more sophisticated operations of the nodes (e.g., node operations based on the priorities of the nodes).

1) Simple Bidirectional Signaling

Figure 28:
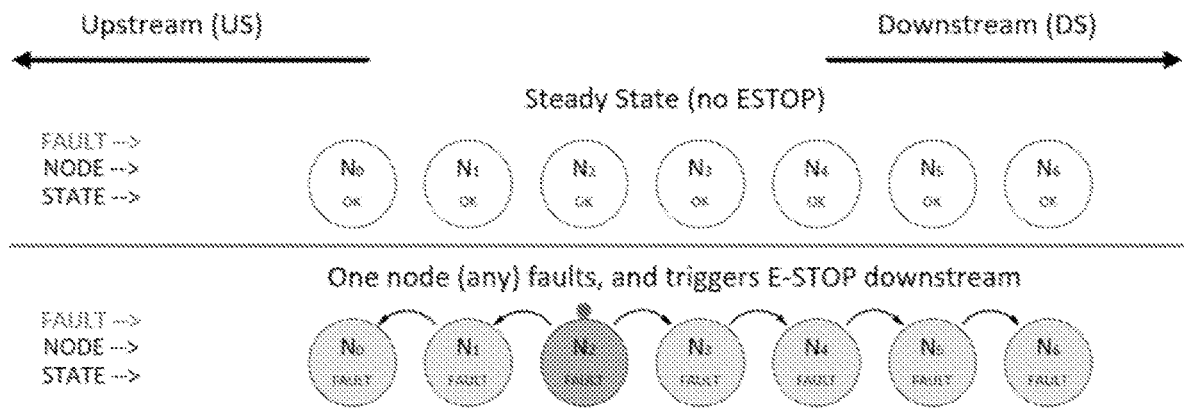
FIG. 28 is a schematic diagram illustrating an example of simple bidirectional communication of emergency signals.

FIG. 28 is a schematic diagram illustrating an example of bidirectional communication of emergency signals. In FIG. 28, an emergency stop signal generated by the node N2 is transmitted both upstream and downstream (e.g., upstream to the node N1 and downstream to the node N3). The emergency signals may further propagate upstream and downstream to other nodes. In some multi-node systems, any of the nodes can trigger emergency signals, and emergency stop signals are released after all nodes are placed out of the fault state (e.g., all nodes are put into the normal state).

Figure 29:
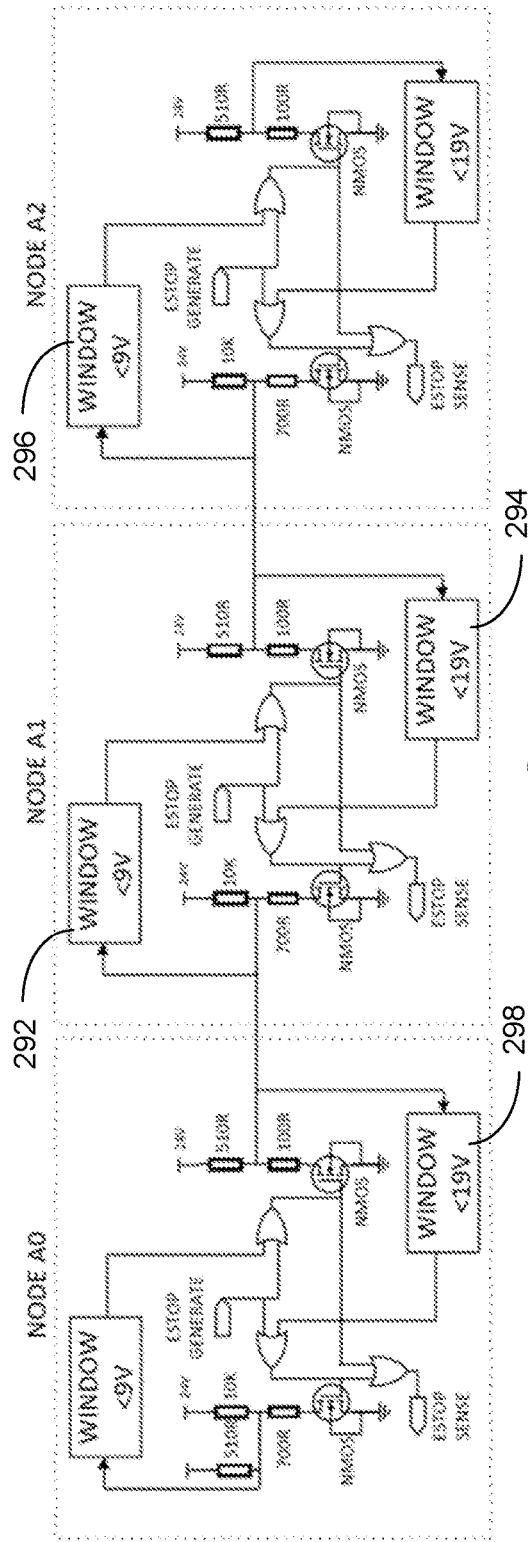
FIG. 29 is a schematic diagram illustrating circuits for simple bidirectional communication of emergency signals in accordance with some embodiments.

An example circuit diagram of a simple bidirectional signaling is shown in FIG. 29. Each node shown in FIG. 29 is capable of generating an emergency signal, which is propagated to adjacent node(s) (e.g., upstream and/or downstream). In FIG. 29, a downstream voltage and/or an upstream voltage can be generated at each node utilizing a voltage divider in a pull-up circuit or a pull-down circuit (e.g., a combination of a switch and a voltage divider). The divided voltage is provided as a common-mode voltage, which is monitored at a voltage monitor in an adjacent node. For example, a downstream common-mode voltage from node A0 to node A1 is monitored at voltage monitor 292 in node A1, whereas an upstream common-mode voltage from node A1 to node A0 will be monitored at a different voltage monitor 298 in node A0. Similarly, an upstream common-mode voltage from node A2 to node A1 is monitored by voltage monitor 294 in node A1.

Unlike in the unidirectional case, in which two voltage levels signify normal functioning and emergency stop signals (e.g., 24 V for a normal state and 4 V for a fault state), in the simple bidirectional case, three voltage levels, for example, a low voltage (e.g., 4 V), a middle voltage (e.g., 14 V), and a high voltage (e.g., 24 V), may be used. The high voltage indicates no emergency signal. The low voltage signifies a downstream emergency signal. The middle voltage signifies an upstream emergency signal. A respective node provides voltages for the upstream and downstream signals, and senses the upstream and downstream common-mode voltages, to determine whether the node should be in a normal state or a fault state. The respective node includes voltage comparators (e.g., window comparators) for sensing the voltage levels. For example, the respective node may include a first voltage comparator (e.g., voltage monitor 292) for monitoring the downstream common-mode voltage and a second voltage comparator (e.g., voltage monitor 294) for monitoring the upstream common-mode voltage. The first voltage comparator may have a first voltage threshold (e.g., 9 V, which corresponds to the midpoint between the low voltage (e.g., 4 V) and the middle voltage (e.g., 14 V)), and the second voltage comparator may have a second voltage threshold (e.g., 19 V, which corresponds to the midpoint between the middle voltage (e.g., 14 V) and the high voltage (e.g., 24 V). For example, node A1 compares the upstream common-mode voltage from node A2 with the second voltage threshold (e.g., 19 V) to determine whether node A1 should go into a fault state. In addition, node A1 also compares the downstream common-mode voltage from node A0 with the first voltage threshold (e.g., 9 V) to determine whether node A1 should go into a fault state.

In some embodiments, the first voltage threshold is less than the second voltage threshold. Because the common-mode voltage between node A1 and node A2 is monitored by both the first voltage monitor (e.g., voltage monitor 296) in node A2 and the second voltage monitor (e.g., voltage monitor 294) in node A1, a common-mode voltage between node A1 and node A2 satisfying the first voltage threshold also satisfies the second voltage threshold, in such embodiments. For example, a common-mode voltage between node A1 and node A2 less than 9 V satisfies both upstream and downstream fault state conditions indistinguishably.

2) Complex Bidirectional Signaling

Figure 30:
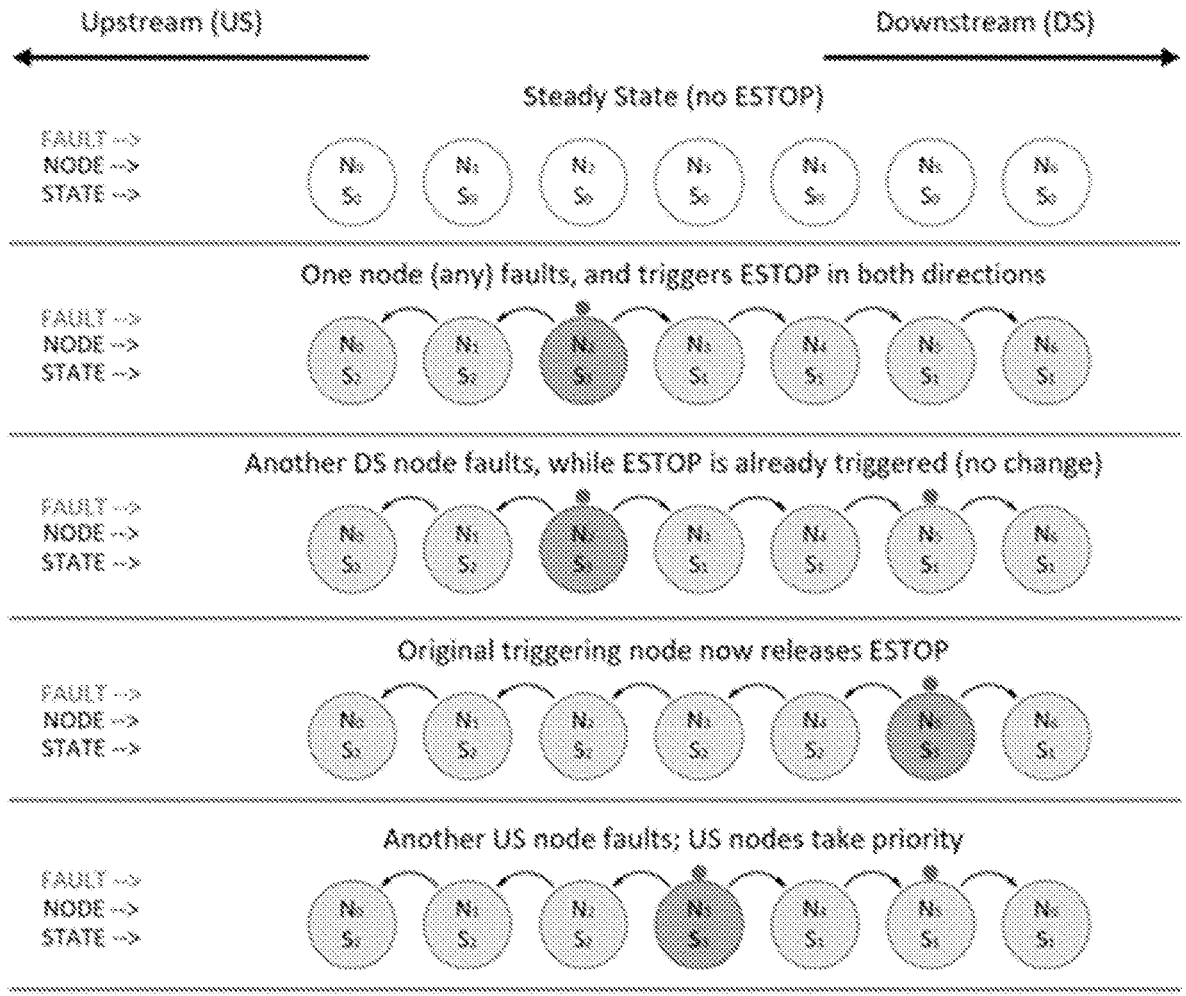
FIG. 30 is a schematic diagram illustrating another example of complex bidirectional communication of emergency signals.

In some embodiments, a complex bidirectional communication system may be used to prioritize between upstream signals and downstream signals (e.g., upstream nodes get priority (and hence override authority) over emergency signals trigger and de-trigger). FIG. 30 shows an example of complex bidirectional communication, in which faults at certain nodes can take priority over others.

In FIG. 30, when none of the nodes generates an emergency signal, all of the nodes are in the normal state. However, when node N2 enters a fault state and propagates an emergency signal both upstream and downstream, the upstream nodes and the downstream nodes also enter the fault state.

When node N5 also generates a separate fault while the nodes are in the fault state (e.g., due to the emergency signal originating from node N2) and if the nodes are configured so that the fault of an upstream node (e.g., node N2) takes priority over the fault of a downstream node (e.g., node N5), the emergency signals do not change in connection with the fault at node N5 as the emergency signal originating from node N2 is propagated through the nodes.

However, when the fault of node N2 clears, the emergency signals between nodes N2 and N5 change from downstream emergency signals to upstream emergency signals.

When node N3 generates a separate fault while the nodes are in the fault state (due to the emergency signal originating from node N5) and if the nodes are configured so that the fault of an upstream node (e.g., node N3) takes priority over the fault of a downstream node (e.g., node N5), the emergency signals between nodes N3 and N5 change from upstream emergency signals to downstream emergency signals. In the complex bidirectional circuits, the upstream and downstream emergency signals are discernible so that certain nodes get priority in setting the fault state as described above.

Figure 31:
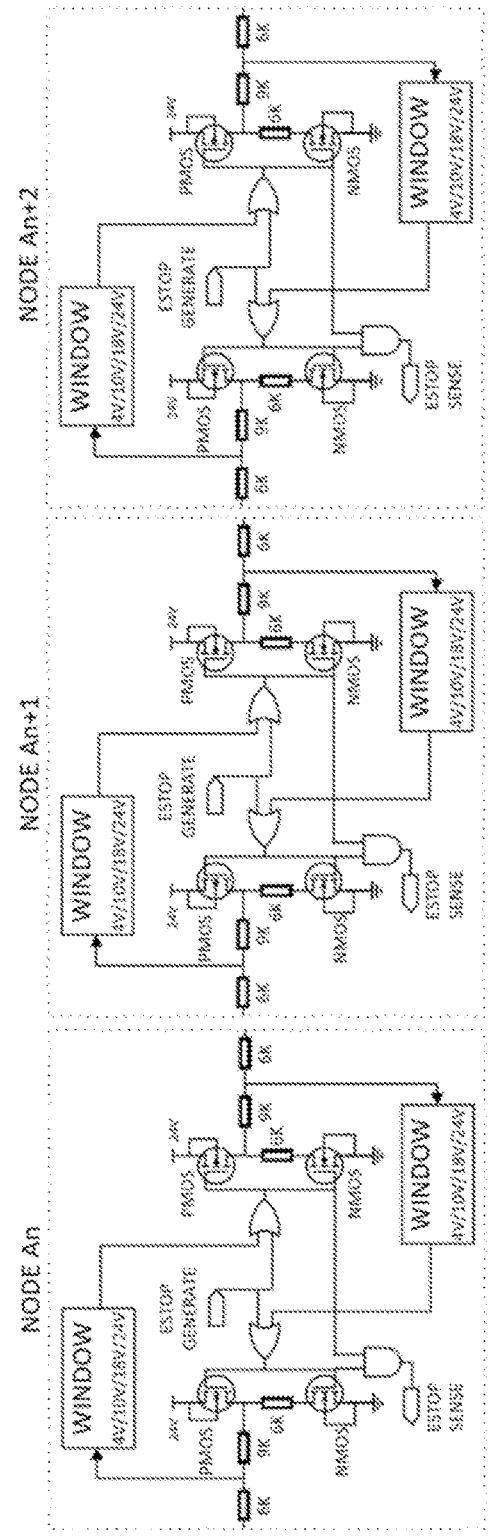
FIG. 31 is a schematic diagram illustrating circuits for complex bidirectional communication of emergency signals in accordance with some embodiments.

An example circuit for a complex bidirectional signaling is shown in FIG. 31. In the circuit shown in FIG. 31, four common-mode voltage levels are used. For example, the voltage levels may be 4, 10, 18, and 24 V, as shown in FIG. 31. In some embodiments, comparators in a respective node have three thresholds (e.g., the first threshold (e.g., 7 V), the second threshold (e.g., 14 V), and the third threshold (e.g., 21 V)). The comparators determine that a monitored voltage is below the first threshold (e.g., 4 V), between the first threshold and the second threshold (e.g., 10 V), between the second threshold and the third threshold (e.g., 18 V), or above the fourth threshold (e.g., 24 V), although the comparators may trigger a logic signal as long as the monitored voltage is less than the fourth threshold, indicating that there is a fault either upstream or downstream of the node. However, whether the monitored voltage is below the first threshold, between the first threshold and the second threshold, between the second threshold and the third threshold, or above the fourth threshold can indicate whether the fault originates from the upstream or downstream of the node and may be used to determine how the node will prioritize upstream or downstream signals.

In some embodiments, a respective node includes totem-pole drivers to pull one end of the communication line to a high voltage (e.g., 24 V) or to a low voltage (e.g., 4 V) to signal a fault state.

Figure 32:
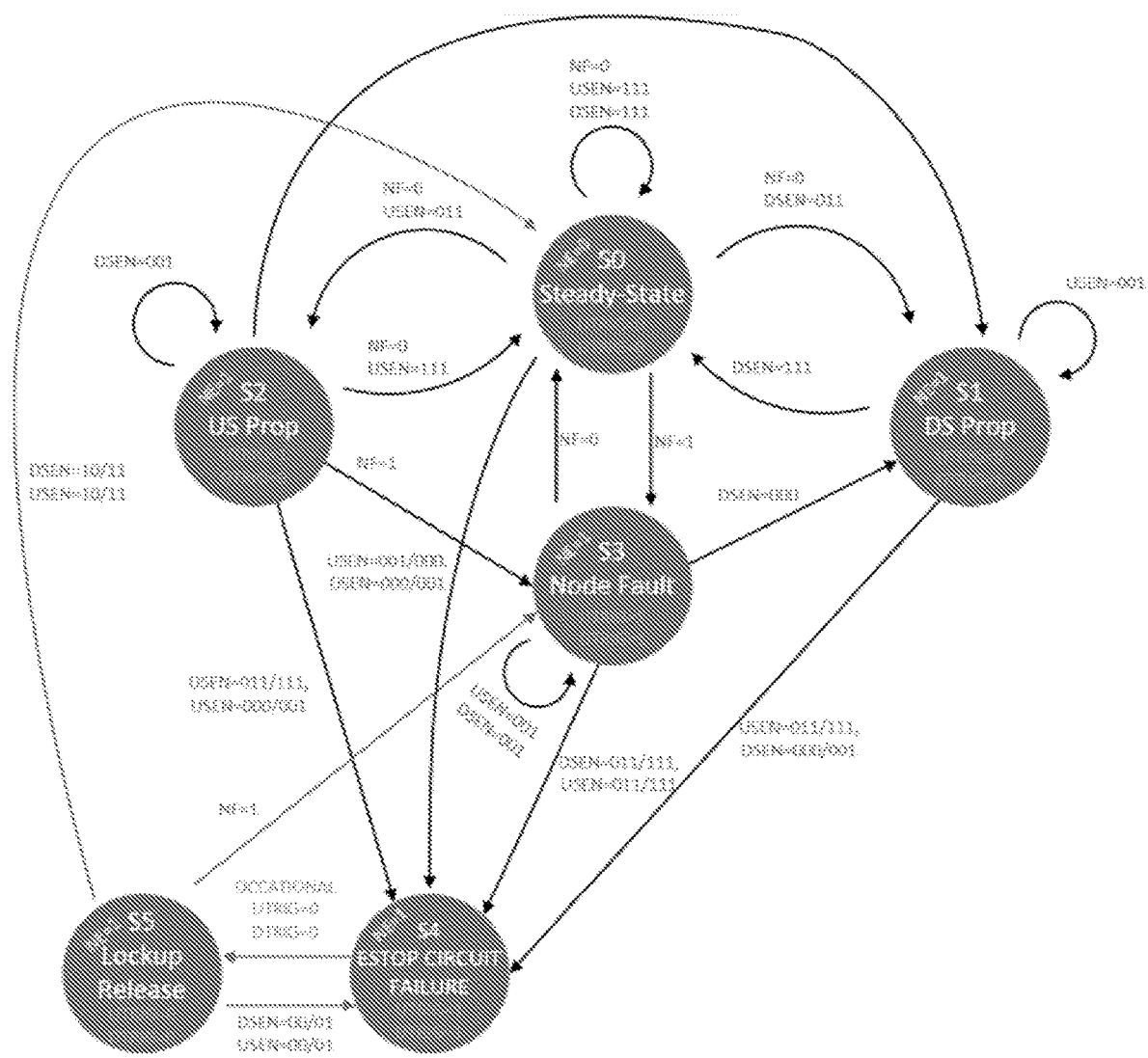
FIG. 32 is a state machine diagram illustrating states of a node in accordance with some embodiments.

Compared with the simple bidirectional case, the complex bidirectional communication circuit allows distinguishing a fault generated within the node to faults generated by other nodes in addition to distinguishing upstream and downstream signals, which, in turn, allows more sophisticated handling of the emergency signals as described with respect to FIG. 30. Each node is required to be in one of four possible states, as described with the state machine diagram shown in FIG. 32, in which the following notations are used.

DS: Downstream
US: Upstream
PD: Pull Down
PU: Pull Up
NF: Node Fault
NE: Node Emergency Stop
DSEN: Downstream Sense
USEN: Upstream Sense
DTRIG: Downstream Trigger
UTRIG: Upstream Trigger An example window sense table that may be used for the comparators (e.g., window comparators) are as follows:

| Voltage Level | Threshold(s) | USEN/DSEN | Indication |
|---|---|---|---|
| 4 V | $V_{SENSE} < 7$ V | 000 | Remote PD and Local PD |
| 10 V | $7$ V $< V_{SENSE} < 14$ V | 001 | Local PD |
| 18 V | $14$ V $< V_{SENSE} < 21$ V | 011 | Remote PD |
| 24 V | $21$ V $< V_{SENSE}$ | 111 | Steady State (normal) |

3. Implementations

The above-discussed communication systems may be implemented in a robotic system.

In accordance with some embodiments, a robotic system includes a first node (e.g., a first motorized joint, such as a motorized joint with a motorized driver A0 on robotic arm 142A shown in FIG. 23) and a second node (e.g., a second motorized joint, such as a motorized joint with a motorized driver A1 on robotic arm 142A shown in FIG. 23), and a first pair of electrical conductors (e.g., a pair of electrical wires 261 in twisted-pair cable, such as 10BASE-T, 100BASE-T, 1000BASE-T, 10GBASE-T, 25GBASE-T, or 40GBASE-T, for communication pursuant to Ethernet, Ethercat, RS422, LVDS protocols) for differential communication between the first node and the second node (e.g., the first pair of electrical conductors is electrically coupled with the first node and the second node) so that data signals (e.g., data packets or unpacked data that include or indicate motion commands and/or sensor information) are communicated between the first node and the second node as differential signals.

In some embodiments, the first node comprises a first motorized joint and the second node comprises a second motorized joint (e.g., joints 24 shown in FIG. 2, where the first node may include a motorized joint with a motorized driver A0 on robotic arm 142A and the second node may include a motorized joint with a motorized driver A1 on robotic arm 142A shown in FIG. 23). In some embodiments, a respective motorized joint includes a motor driver for a respective motor. In some embodiments, the motor driver is configured to move (e.g., by actuating the respective motor) one or more components of the robotic system, such as a link of a robotic arm (e.g., linkages 23), a set-up joint, or a bed, in response to a data signal. For example, the motor driver may cause clockwise rotation of the respective motor in response to a data signal of a first type and cause counter-clockwise rotation of the respective motor in response to a data signal of a second type.

In some embodiments, the first motorized joint and the second motorized joint are joints on a single robotic arm (e.g., robotic arm 142A). In some embodiments, the single robotic arm has multiple motorized joints to provide a high degree of freedom.

In some embodiments, the first motorized joint is located on a first robotic arm (e.g., motorized joint A0 of robotic arm 142A) and the second motorized joint is located on a second robotic arm (e.g., motorized joint A1 of robotic arm 142B) distinct from the first robotic arm (e.g., the first motorized joint and the second motorized joint are on different robotic arms). In some embodiments, the first robotic arm and the second robotic arm are located adjacently to each other (e.g., the first robotic arm and the second robotic arm may be located on a same arm mount as shown in FIG. 6).

In some embodiments, the first motorized joint is located on a robotic arm and the second motorized joint is on a bar supporting the robotic arm (e.g., the first motorized joint is positioned to move at least one link of a robotic arm and the second motorized joint is positioned to move the adjustable arm support 105, which moves the entire robotic arm).

The first node includes a first electrical circuit (e.g., circuit 253) electrically coupled (directly or indirectly, for example, through one or more electrical components, such as wires, connectors, resistors, etc.) with the first pair of electrical conductors, and the first electrical circuit communicates (e.g., the first electrical circuit is configured to communicate) emergency stop signals between the first node and the second node as non-differential signals (e.g., common-mode signals) over the first pair of electrical conductors. In some embodiments, the data signals are encoded (e.g., encoded serially in data packets or in unpacked data) while the emergency stop signals are not encoded so that responding to the emergency stop signals does not require decoding, which reduces the response time.

In some embodiments, the data signals also include sensor information (e.g., information indicating position, speed, and/or acceleration of the respective motor as provided by the motor driver or as detected by one or more sensors, or information indicating a contact, such as the presence of the contact and/or a position or force of the contact, in a kinematic chain coupled with the respective motorized joint).

In some embodiments, the first node also includes a first data circuit (e.g., circuits 256 and 257) for sending and/or receiving data signals (e.g., robotic commands and/or sensor data). In some embodiments, the first data circuit sends and/or receives data signals as digital signals. In some embodiments, the first data circuit sends and/or receives data signals as analog signals. In some embodiments, the first node also includes a combiner circuit (e.g., circuit 262) for combining the differential signals and the non-differential signals. For example, the combiner circuit may include an inductor with a tap (e.g., a center tap) coupled with the first electrical circuit. Alternatively, the combiner circuit may include one or more operational amplifiers for combining the differential signals and the non-differential signals.

In some embodiments, the first node is upstream of the second node in a multi-node communication system (e.g., the first node is node A0 and the second node is node A1 in FIG. 27). In some embodiments, the first node includes an electrical circuit for transmitting signals (e.g., electrical signals, such as emergency stop signals and/or data signals) to the second node and the second node includes an electrical circuit for receiving signals from the first node (e.g., the first node includes a pull-down circuit in conjunction with circuit 262 for combining emergency signals with differential signals, and the second node includes a voltage monitor, such as a voltage comparator, in conjunction with circuit 264 for extracting the common-mode voltage signals).

In some embodiments, the second node includes a second electrical circuit (e.g., circuit 255) for receiving the emergency stop signals. In some embodiments, the second node (or the second electrical circuit of the second node) includes a first voltage monitor (e.g., voltage monitor 272) for sensing a common-mode voltage for the first pair of electrical conductors between the first node and the second node. For example, the common-mode voltage corresponds to a weighted average of voltages on the first pair of electrical conductors, such as a center tap voltage.

In some embodiments, the second node also includes a second data circuit (e.g., circuits 258 and 259) for receiving and/or sending data signals. In some embodiments, the second node also includes a splitter circuit (e.g., circuit 264) for splitting the differential signals and the non-differential signals. For example, the splitter circuit may include an inductor coupled with the first pair of electrical conductors and the second data circuit. The inductor of the splitter circuit may have a center tap coupled with the second electrical circuit 255. Alternatively, the splitter circuit may include one or more operational amplifiers for splitting the differential signals and the non-differential signals.

In some embodiments, the robotic system also includes another pair of electrical conductors (e.g., transmission lines compared to the first pair of electrical conductors, which may be used as receiving lines) extending between the first node and the second node (e.g., a pair of electrical wires 263 in a twisted-pair cable). In some embodiments, the first pair of electrical conductors and another pair of electrical conductors have a same common-mode voltage. In some embodiments, the first pair of electrical conductors and another pair of electrical conductors have different common-mode voltages.

In some embodiments, the second node includes a second electrical circuit for generating an emergency stop signal in response to the common-mode voltage detected by the first voltage monitor satisfying a predefined voltage threshold (e.g., the common-mode voltage is a low voltage (e.g., 4 V). For example, node A1 in FIG. 27 includes a pull-down circuit that generates a low voltage (e.g., 4 V) emergency signal in response to the common-mode voltage detected by the voltage monitor 272 falling below the threshold voltage, such as 14 V.

In some embodiments, the second electrical circuit is configured to forgo generating emergency stop signals while the common-mode voltage detected by the first voltage monitor does not satisfy the predefined voltage threshold (e.g., the common-mode voltage is a high voltage (e.g., 24 V)). For example, the pull-down circuit of node A1, shown in FIG. 27, provides a high voltage (e.g., 24 V) while the common-mode voltage detected by the voltage monitor 272 is above the threshold voltage, such as 14 V.

In some embodiments, the second electrical circuit is also configured to generate an emergency stop signal in response to receiving an emergency stop generator signal that is distinct from a signal from the first voltage monitor. For example, node A1 includes a logic circuit (e.g., an OR circuit) coupled with a switch (e.g., a transistor, such as an NMOS) so that the switch pulls down the voltage of the voltage divider in response to a logic signal from the voltage monitor or a separate, independent logic signal that indicates a fault originating from within node A1.

In some embodiments, the robotic system includes a third node (e.g., node A2 in FIG. 27), and a second pair of electrical conductors for differential communication between the second node and the third node so that data signals (e.g., motion command, sensor information) are communicated between the second node and the third node as differential signals. Emergency stop signals are communicated between the second node and the third node as non-differential signals (e.g., common-mode signals) over the second pair of electrical conductors.

In some embodiments, the second electrical circuit communicates an emergency stop signal by changing (e.g., lower) a common-mode voltage for the second pair of electrical conductors.

In some embodiments, the second electrical circuit includes a second voltage monitor (e.g., voltage monitor 294) for sensing a common-mode voltage for the second pair of electrical conductors between the second node and the third node (for monitoring the upstream emergency signal from the third node).

In some embodiments, the first electrical circuit includes a voltage monitor (e.g., voltage monitor 298) for sensing a common-mode voltage for the first pair of electrical conductors between the first node and the second node (for monitoring the upstream emergency signal from the second node).

In some embodiments, the first node is capable of communicating an emergency stop signal only in a unilateral direction from the first node to the second node (e.g., node A0 in FIG. 27). In some embodiments, the first node is not capable of communicating the emergency stop signal between the first node and the second node bidirectionally (e.g., node A0 in FIG. 27 does not includes a voltage monitor for monitoring the common-mode voltage between node A0 and node A1).

In some embodiments, the first node is capable of communicating an emergency stop signal bidirectionally from the first node to the second node, or from the second node to the first node (e.g., node A1 in FIG. 29). In some embodiments, multiple common mode voltage levels are used to indicate an upstream emergency stop signal and a downstream emergency stop signal (e.g., a first common mode voltage level is used to indicate the upstream emergency stop signal and a second common mode voltage distinct from the first common mode voltage is used to indicate the downstream emergency stop signal). In some embodiments, multiple voltage divider circuits are used to provide the multiple common mode voltage levels (e.g., a pull-down circuit in the first node and a pull-down circuit in the second node collectively determine the common-mode voltage in an electrical conductor (or a pair of electrical conductors) extending between the first node and the second node).

Figure 33:
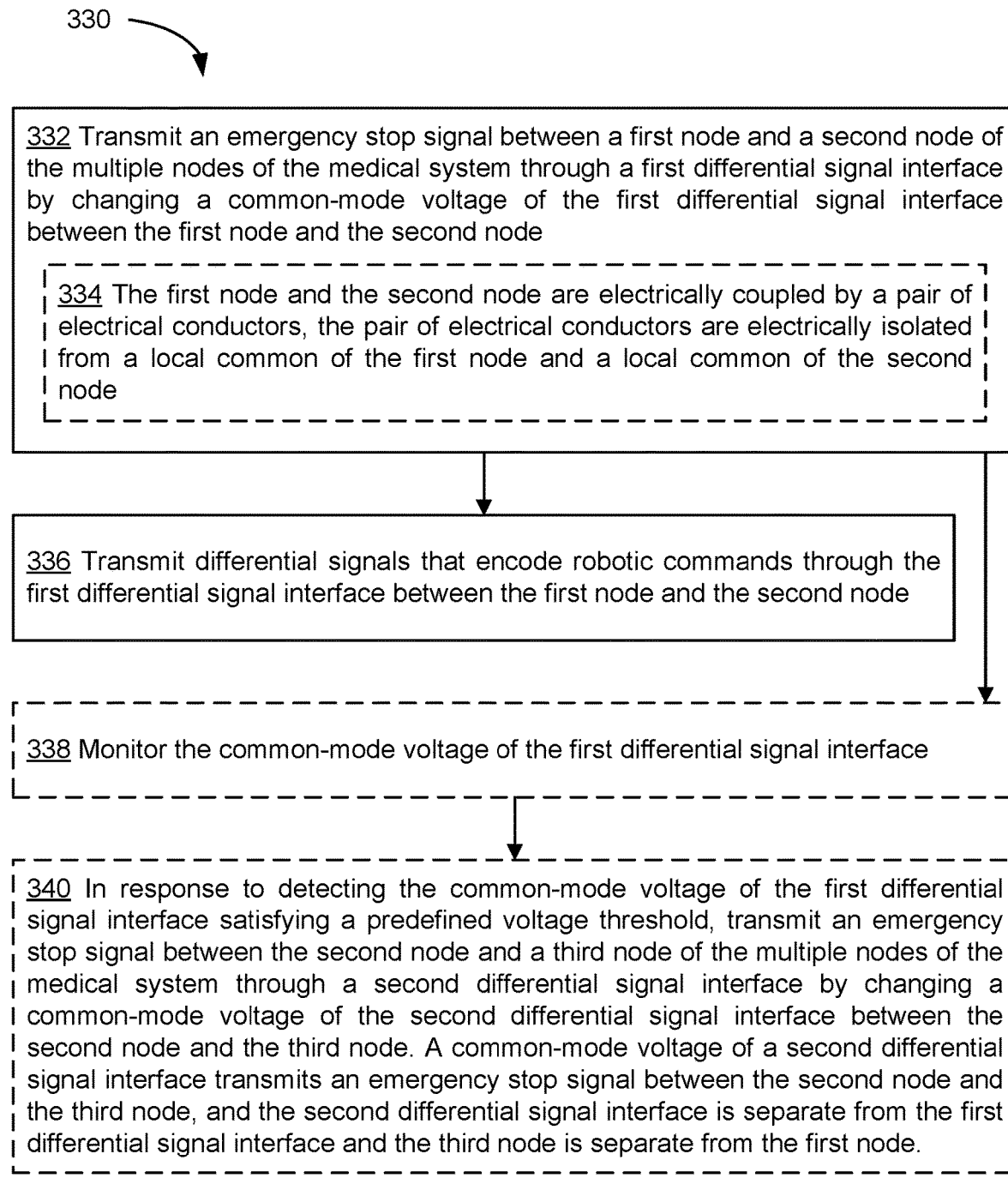
FIG. 33 is a flow diagram illustrating a method of communicating emergency signals in accordance with some embodiments.

FIG. 33 is a flow diagram illustrating a method 330 of a method of communicating emergency signals in accordance with some embodiments. The method 330 is performed by nodes of a robotic system (e.g., a medical robotic system described with respect to FIGS. 21-23).

The method 330 includes (332) transmitting an emergency stop signal between a first node and a second node of the multiple nodes of the medical system through a first differential signal interface by changing a common-mode voltage of the first differential signal interface between the first node and the second node (e.g., changing the common-mode voltage as shown in inset 281, 283, or 285 of FIG. 25).

In some embodiments, the first node and the second node are (334) electrically coupled by a pair of electrical conductors (e.g., a pair of electrical conductors 261). The pair of electrical conductors are electrically isolated from a local common of the first node and a local common of the second node.

In some embodiments, the method 330 includes (336) transmitting differential signals that encode robotic commands through the first differential signal interface between the first node and the second node (e.g., the differential signals shown in inset 282 or 284 are transmitted as part of combined electrical signals shown in inset 283 or 285).

In some embodiments, the method 330 includes (338) monitoring the common-mode voltage of the first differential signal interface (e.g., with a voltage monitor 272); and, (340) in response to detecting the common-mode voltage of the first differential signal interface satisfying a predefined voltage threshold, transmitting an emergency stop signal between the second node and a third node of the multiple nodes of the medical system through a second differential signal interface by changing a common-mode voltage of the second differential signal interface between the second node and the third node (e.g., using the pull-down circuit of node A1 shown in FIG. 27). A common-mode voltage of a second differential signal interface transmits an emergency stop signal between the second node and the third node, and the second differential signal interface is separate from the first differential signal interface and the third node is separate from the first node.

4. Terminology

Embodiments disclosed herein provide systems, methods and apparatus for robotic systems that can communicate emergency signals over differential signal lines without requiring additional communication lines.

It should be noted that the terms "couple," "coupling," "coupled" or other variations of the word couple as used herein may indicate either an indirect connection or a direct connection. For example, if a first component is "coupled" to a second component, the first component may be either indirectly connected to the second component via another component or directly connected to the second component.

The functions for communicating emergency signals in a robotic system described herein may be stored as one or more instructions on a processor-readable or computer-readable medium. The term "computer-readable medium" refers to any available medium that can be accessed by a computer or processor. By way of example, and not limitation, such a medium may comprise random access memory (RAM), read-only memory (ROM), electrically erasable programmable read-only memory (EEPROM), flash memory, compact disc read-only memory (CD-ROM) or other optical disk storage, magnetic disk storage or other magnetic storage devices, or any other medium that can be used to store desired program code in the form of instructions or data structures and that can be accessed by a computer. It should be noted that a computer-readable medium may be tangible and non-transitory. As used herein, the term "code" may refer to software, instructions, code or data that is/are executable by a computing device or processor.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

As used herein, the term "plurality" denotes two or more. For example, a plurality of components indicates two or more components. The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the scope of the invention. For example, it will be appreciated that one of ordinary skill in the art will be able to employ a number corresponding alternative and equivalent structural details, such as equivalent ways of fastening, mounting, coupling, or engaging tool components, equivalent mechanisms for producing particular actuation motions, and equivalent mechanisms for delivering electrical energy. Thus, the present invention is not intended to be limited to the embodiments shown herein but is to be accorded the widest scope consistent with the principles and novel features disclosed herein.

Some embodiments or implementations are described with respect to the following clauses:

Clause 1. A robotic system, comprising:
  a first node and a second node; and
  a first pair of electrical conductors for differential communication between the first node and the second node so that data signals are communicated between the first node and the second node as differential signals,
  wherein the first node includes a first electrical circuit electrically coupled with the first pair of electrical conductors, and the first electrical circuit communicates emergency stop signals between the first node and the second node as non-differential signals over the first pair of electrical conductors.

Clause 2. The robotic system of clause 1, wherein:
  the first node comprises a first motorized joint and the second node comprises a second motorized joint.

Clause 3. The robotic system of clause 2, wherein:
  the first motorized joint and the second motorized joint are joints on a single robotic arm.

Clause 4. The robotic system of clause 2 or 3, wherein:
  the first motorized joint is located on a first robotic arm and the second motorized joint is located on a second robotic arm distinct from the first robotic arm.

Clause 5. The robotic system of any of clauses 2-4, wherein:
  the first motorized joint is located on a robotic arm and the second motorized joint is on a bar supporting the robotic arm.

Clause 6. The robotic system of any of clauses 1-5, wherein:
  the first node is upstream of the second node in a multi-node communication system.

Clause 7. The robotic system of any of clauses 1-6, wherein:
  the second node comprises a first voltage monitor for sensing a common-mode voltage for the first pair of electrical conductors between the first node and the second node.

Clause 8. The robotic system of clause 7, wherein:
  the second node includes a second electrical circuit for generating an emergency stop signal in response to the common-mode voltage detected by the first voltage monitor satisfying a predefined voltage threshold.

Clause 9. The robotic system of clause 8, wherein:
  the second electrical circuit is configured to forgo generating an emergency stop signal while the common-mode voltage detected by the first voltage monitor does not satisfy the predefined voltage threshold.

Clause 10. The robotic system of clause 8 or 9, wherein:
  the second electrical circuit is configured to generate an emergency stop signal in response to receiving an emergency stop generator signal that is distinct from a signal from the first voltage monitor.

Clause 11. The robotic system of any of clauses 8-10, further comprising: a third node; and
  a second pair of electrical conductors for differential communication between the second node and the third node so that data signals are communicated between the second node and the third node as differential signals, wherein emergency stop signals are communicated between the second node and the third node as non-differential signals over the second pair of electrical conductors.

Clause 12. The robotic system of clause 11, wherein:
  the second electrical circuit communicates an emergency stop signal by changing a common-mode voltage for the second pair of electrical conductors.

Clause 13. The robotic system of clause 11 or 12, wherein:
  the second electrical circuit includes a second voltage monitor for sensing a center tap voltage for the second pair of electrical conductors between the second node and the third node.

Clause 14. The robotic system of any of clauses 1-13, wherein:
  the first electrical circuit includes a voltage monitor for sensing a center tap voltage for the first pair of electrical conductors between the first node and the second node.

Clause 15. The robotic system of any of clauses 1-14, wherein:
  the first node is capable of communicating an emergency stop signal only in a unilateral direction from the first node to the second node.

Clause 16. The robotic system of any of clauses 1-15, wherein:
  the first node is capable of communicating an emergency stop signal bidirectionally from the first node to the second node, or from the second node to the first node.

Clause 17. A method for transmitting an emergency stop signal in a medical system with multiple nodes, the method comprising:
  transmitting an emergency stop signal between a first node and a second node of the multiple nodes of the medical system through a first differential signal interface by changing a common-mode voltage of the first differential signal interface between the first node and the second node.

Clause 18. The method of clause 17, wherein:
  the first node and the second node are electrically coupled by a pair of electrical conductors, the pair of electrical conductors are electrically isolated from a local common of the first node and a local common of the second node.

Clause 19. The method of clause 17 or 18, further comprising:
  transmitting differential signals that encode robotic commands through the first differential signal interface between the first node and the second node.

Clause 20. The method of any of clauses 17-19, further comprising:
  monitoring the common-mode voltage of the first differential signal interface; and
  in response to detecting the common-mode voltage of the first differential signal interface satisfying a predefined voltage threshold, transmitting an emergency stop signal between the second node and a third node of the multiple nodes of the medical system through a second differential signal interface by changing a common-mode voltage of the second differential signal interface between the second node and the third node,
  wherein a common-mode voltage of a second differential signal interface transmits an emergency stop signal between the second node and the third node, and the second differential signal interface is separate from the first differential signal interface and the third node is separate from the first node.

What is claimed is:

1. A robotic system, comprising:
  a first node and a second node; and
  a first pair of electrical conductors for differential communication between the first node and the second node so that the first pair of electrical conductors are operable to communicate data signals between the first node and the second node as differential signals, wherein the first node includes a first electrical circuit electrically coupled with the first pair of electrical conductors, and the first electrical circuit is operable to communicate emergency stop signals between the first node and the second node as non-differential signals over the first pair of electrical conductors, wherein the second node comprises a first voltage monitor for sensing a common-mode voltage for the first pair of electrical conductors between the first node and the second node.

2. The robotic system of claim 1, wherein the first node comprises a first motorized joint and the second node comprises a second motorized joint.

3. The robotic system of claim 2, wherein the first motorized joint and the second motorized joint are joints on a single robotic arm.

4. The robotic system of claim 2, wherein the first motorized joint is located on a first robotic arm and the second motorized joint is located on a second robotic arm distinct from the first robotic arm.

5. The robotic system of claim 2, wherein the first motorized joint is located on a robotic arm and the second motorized joint is on a bar supporting the robotic arm.

6. The robotic system of claim 1, wherein the first node is upstream of the second node in a multi-node communication system.

7. The robotic system of claim 1, wherein the second node includes a second electrical circuit for generating an emergency stop signal in response to the common-mode voltage detected by the first voltage monitor satisfying a predefined voltage threshold.

8. The robotic system of claim 7, wherein the second electrical circuit is configured to forgo generating an emergency stop signal while the common-mode voltage detected by the first voltage monitor does not satisfy the predefined voltage threshold.

9. The robotic system of claim 7, wherein the second electrical circuit is configured to generate an emergency stop signal in response to receiving an emergency stop generator signal that is distinct from a signal from the first voltage monitor.

10. The robotic system of claim 7, further comprising:
  a third node; and
  a second pair of electrical conductors for differential communication between the second node and the third node so that data signals are communicated between the second node and the third node as differential signals, wherein emergency stop signals are communicated between the second node and the third node as non-differential signals over the second pair of electrical conductors.

11. The robotic system of claim 10, wherein the second electrical circuit communicates an emergency stop signal by changing a common-mode voltage for the second pair of electrical conductors.

12. The robotic system of claim 10, wherein the second electrical circuit includes a second voltage monitor for sensing a center tap voltage for the second pair of electrical conductors between the second node and the third node.

13. The robotic system of claim 1, wherein the first electrical circuit includes a voltage monitor for sensing a center tap voltage for the first pair of electrical conductors between the first node and the second node.

14. The robotic system of claim 1, wherein the first node is capable of communicating an emergency stop signal only in a unilateral direction from the first node to the second node.

15. The robotic system of claim 1, wherein the first node is capable of communicating an emergency stop signal bidirectionally from the first node to the second node, or from the second node to the first node.

16. A method for transmitting an emergency stop signal in a medical system with multiple nodes, the method comprising:
  transmitting an emergency stop signal between a first node and a second node of the multiple nodes of the medical system through a first differential signal interface by changing a common-mode voltage of the first differential signal interface between the first node and the second node;
  monitoring the common-mode voltage of the first differential signal interface; and
  in response to detecting the common-mode voltage of the first differential signal interface satisfying a predefined voltage threshold, transmitting an emergency stop signal between the second node and a third node of the multiple nodes of the medical system through a second differential signal interface by changing a common-mode voltage of the second differential signal interface between the second node and the third node, wherein a common-mode voltage of a second differential signal interface transmits an emergency stop signal between the second node and the third node, and the second differential signal interface is separate from the first differential signal interface and the third node is separate from the first node.

17. The method of claim 16, wherein the first node and the second node are electrically coupled by a pair of electrical conductors, the pair of electrical conductors are electrically isolated from a local common of the first node and a local common of the second node.

18. The method of claim 16, further comprising transmitting differential signals that encode robotic commands through the first differential signal interface between the first node and the second node.

\* \* \* \* \*